(12) United States Patent
Butt et al.

(10) Patent No.: US 10,339,971 B1
(45) Date of Patent: Jul. 2, 2019

(54) SEQUENTIAL DATA STORAGE WITH REWRITE USING DEAD-TRACK DETECTION

(71) Applicant: International Business Machines Corporation, Armonk, NY (US)

(72) Inventors: Kevin D. Butt, Tucson, AZ (US); Roy D. Cideciyan, Rueschlikon (CH); Simeon Furrer, Altdorf (CH); Mark A. Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/847,751

(22) Filed: Dec. 19, 2017

(51) Int. Cl.
*G11B 20/18* (2006.01)
*G11B 5/008* (2006.01)

(52) U.S. Cl.
CPC ...... *G11B 20/1833* (2013.01); *G11B 5/00813* (2013.01); *G11B 20/1866* (2013.01); *G11B 20/18* (2013.01); *G11B 20/1803* (2013.01); *G11B 20/1809* (2013.01); *G11B 2020/1843* (2013.01)

(58) Field of Classification Search
None
See application file for complete search history.

(56) References Cited

U.S. PATENT DOCUMENTS

| | | | |
|---|---|---|---|
| 6,112,324 | A | 8/2000 | Howe et al. |
| 9,412,410 | B1 | 8/2016 | Bentley et al. |
| 9,584,162 | B1 * | 2/2017 | Bentley .................. G06F 11/10 360/40 |
| 9,666,225 | B2 * | 5/2017 | Cideciyan ........ G11B 20/10009 360/40 |
| 9,837,117 | B2 | 12/2017 | Bentley et al. |

(Continued)

FOREIGN PATENT DOCUMENTS

| WO | 9512849 A1 | 5/1995 |
|---|---|---|
| WO | 2015108995 A1 | 7/2015 |
| WO | 2015119441 A1 | 8/2015 |

OTHER PUBLICATIONS

Cideciyan et al., U.S. Appl. No. 15/847,774, filed Dec. 19, 2017.
(Continued)

*Primary Examiner* — Tan X Dinh
(74) *Attorney, Agent, or Firm* — Zilka-Kotab, P.C.

(57) ABSTRACT

In one embodiment, a system includes a magnetic head having a plurality of write transducers and a plurality of read transducers. Each read transducer is configured to read data from a sequential access medium after being written thereto by a corresponding write transducer. The system also includes a controller and logic integrated with and/or executable by the controller. The logic is configured to read, using the plurality of read transducers, encoded data from a plurality of tracks of the sequential access medium simultaneously. The logic is also configured to determine that one or more tracks of the sequential access medium are dead within a sliding window. Moreover, the logic is configured to rewrite a set of encoded data from the one or more dead tracks to live tracks in a rewrite area of the sequential access medium. Other systems, methods, and computer program products are described according to more embodiments.

18 Claims, 22 Drawing Sheets

(56) References Cited

U.S. PATENT DOCUMENTS

| | | | |
|---|---|---|---|
| 10,120,599 B2* | 11/2018 | Cideciyan | G06F 3/0619 |
| 2004/0168024 A1 | 8/2004 | Buckingham | |
| 2008/0235562 A1* | 9/2008 | Eleftheriou | G11B 20/1426 |
| | | | 714/810 |
| 2010/0177422 A1* | 7/2010 | Cideciyan | G11B 20/1201 |
| | | | 360/40 |
| 2010/0180180 A1* | 7/2010 | Cideciyan | G11B 20/1202 |
| | | | 714/771 |
| 2010/0232047 A1* | 9/2010 | Cherubini | G11B 20/1202 |
| | | | 360/48 |
| 2012/0036318 A1* | 2/2012 | Cideciyan | G06F 3/0619 |
| | | | 711/111 |
| 2013/0326306 A1* | 12/2013 | Cideciyan | G11B 20/1426 |
| | | | 714/756 |
| 2015/0015982 A1* | 1/2015 | Cideciyan | G11B 5/00813 |
| | | | 360/40 |
| 2015/0058696 A1* | 2/2015 | Cideciyan | G11B 20/1833 |
| | | | 714/771 |
| 2016/0293221 A1 | 10/2016 | Bentley et al. | |
| 2017/0148486 A1 | 5/2017 | Bentley et al. | |
| 2018/0173439 A1* | 6/2018 | Cideciyan | G06F 3/0655 |

OTHER PUBLICATIONS

Oh et al., "RS-LDPC Concatenated Coding for the Modern Tape Storage Channel," IEEE Transactions on Communications, vol. 64, No. 1, Jan. 2016, pp. 59-69.
Bentley et al., U.S. Appl. No. 14/946,580, filed Nov. 19, 2015.
Bentley et al., U.S. Appl. No. 15/179,789, filed Jun. 10, 2016.
Bentley et al., U.S. Appl. No. 15/785,281, filed Oct. 16, 2017.
Butt et al., U.S. Appl. No. 16/358,131, filed Mar. 19, 2019.

* cited by examiner

SEQUENTIAL DATA STORAGE WITH REWRITE USING DEAD-TRACK DETECTION

BACKGROUND

The present invention relates to storing data to sequential storage media, and more particularly, to improved data storage utilizing rewrites having dead-track detection.

Currently-used linear tape drives which are used to store data sequentially apply product codes for byte-oriented error-correction coding (ECC) to the data prior to storing the data to the tape. These product codes contain two Reed-Solomon (RS) component codes consisting of a C1 row code and a C2 column code. Relatively long (about 1 kB) longitudinal interleaved error correction codewords, also known as codeword interleaves (CWI), are written on tracks of the magnetic medium (e.g., magnetic tape tracks). In current tape drive architectures, CWIs consist of four byte-interleaved RS codewords. During read-while-write, CWIs in a data set (DS) that includes more than a threshold number of errors are rewritten after the writing of the DS that has too many errors therein has been completed. Two CWI sets correspond to a codeword object (CO) set, which represents the minimum amount of data that can be written, or rewritten, on tape using current methodologies. This operating point is selected such that at the beginning of a tape drive's lifetime, the average number of rewritten CWI sets per DS is limited to about two rewritten CWI sets per DS, which corresponds to a 1% rewrite rate. The rewrite rate of 1% is currently reached when a byte error rate at the C1 decoder input is around $1 \times 10^{-4}$.

In current tape drives in the presence of one or more dead tracks, CWIs are rewritten on these dead tracks, which increases the rewrite rate above the desired threshold because of the delay that occurs between the rewriting of a CWI on a dead track and the subsequent reading of that CWI as rewritten on a dead track during read-while-write. This latency is due to a distance between the read element and write element on the head, about 800 microns, and the latency associated with decoding a CWI, about the same as the time needed to read four consecutive CWIs on a track. In other words, a CWI rewritten on a dead track results in an increase of the rewrite rate by at least 2% at the beginning of a tape drive's lifetime.

SUMMARY

In one embodiment, a system includes a magnetic head having a plurality of write transducers and a plurality of read transducers. Each read transducer is configured to read data from a sequential access medium after being written thereto by a corresponding write transducer. The system also includes a controller and logic integrated with and/or executable by the controller. The logic is configured to read, using the plurality of read transducers, encoded data from a plurality of tracks of the sequential access medium simultaneously. The logic is also configured to determine that one or more tracks of the sequential access medium are dead within a sliding window. Moreover, the logic is configured to rewrite a set of encoded data from the one or more dead tracks to one or more live tracks in a rewrite area of the sequential access medium.

In another embodiment, a method includes reading, using the plurality of read transducers, encoded data from a plurality of tracks of a sequential access medium simultaneously. The method also includes determining that one or more tracks of the sequential access medium are dead within a sliding window. Moreover, the method includes rewriting a set of encoded data from the one or more dead tracks to one or more live tracks in a rewrite area of the sequential access medium.

In yet another embodiment, a computer program product includes a computer readable storage medium having program instructions embodied therewith. The embodied program instructions are executable by a processor to cause the processor to read, by the processor using the plurality of read transducers, encoded data from a plurality of tracks of a sequential access medium simultaneously. The embodied program instructions are further executable by the processor to cause the processor to determine, by the processor, that one or more tracks of the sequential access medium are dead within a sliding window. Moreover, the embodied program instructions are executable by the processor to cause the processor to rewrite, by the processor, a set of encoded data from the one or more dead tracks to one or more live tracks in a rewrite area of the sequential access medium.

Other aspects and embodiments of the present invention will become apparent from the following detailed description, which, when taken in conjunction with the drawings, illustrate by way of example the principles of the invention.

DETAILED DESCRIPTION

Figure 1:
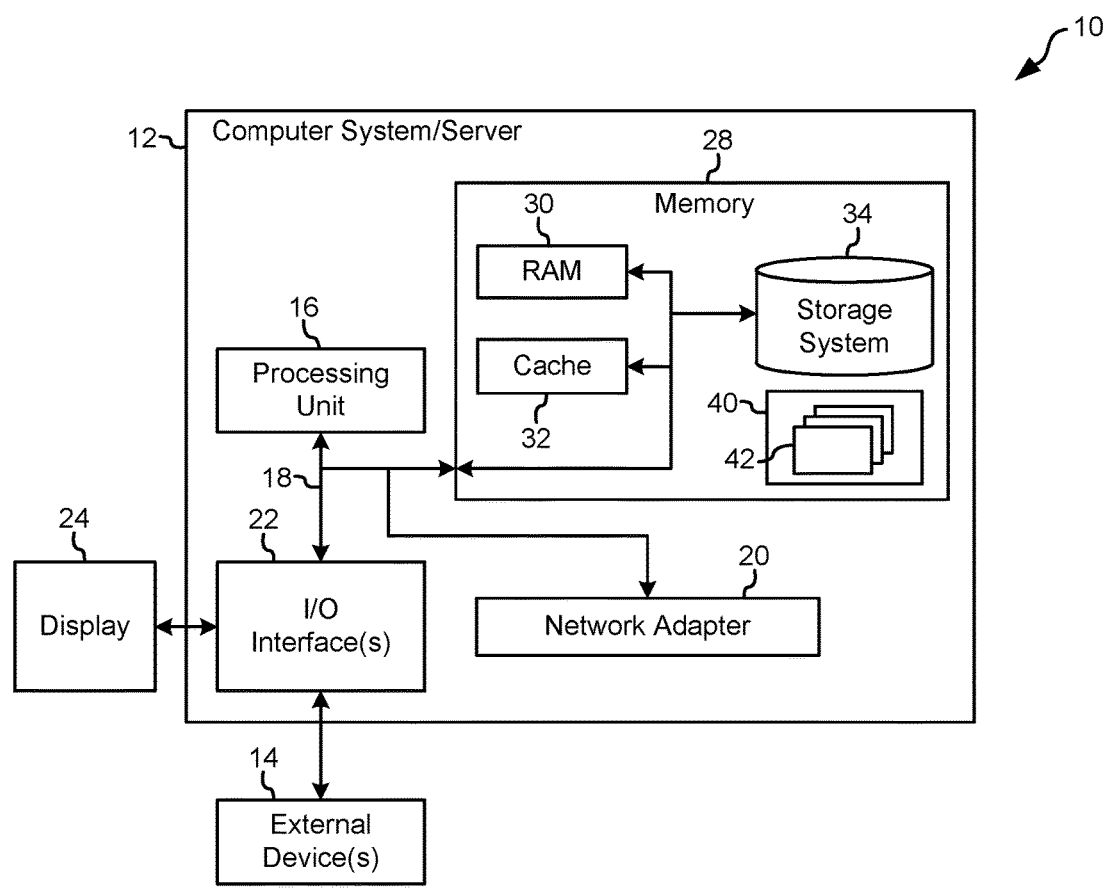
FIG. 1 illustrates a network storage system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about"±10% of the value. For example, "about 10" indicates all values from and including 9.0 to 11.0.

The following description discloses several preferred embodiments of systems, methods, and computer program products for data rewrite on sequential data storage media that detects and accounts for dead track(s).

In one general embodiment, a system includes a magnetic head having a plurality of write transducers and a plurality of read transducers. Each read transducer is configured to read data from a sequential access medium after being written thereto by a corresponding write transducer. The system also includes a controller and logic integrated with and/or executable by the controller. The logic is configured to read, using the plurality of read transducers, encoded data from a plurality of tracks of the sequential access medium simultaneously. The logic is also configured to determine that one or more tracks of the sequential access medium are dead within a sliding window. Moreover, the logic is configured to rewrite a set of encoded data from the one or more dead tracks to one or more live tracks in a rewrite area of the sequential access medium.

In another general embodiment, a method includes reading, using the plurality of read transducers, encoded data from a plurality of tracks of a sequential access medium simultaneously. The method also includes determining that one or more tracks of the sequential access medium are dead within a sliding window. Moreover, the method includes rewriting a set of encoded data from the one or more dead tracks to one or more live tracks in a rewrite area of the sequential access medium.

In yet another general embodiment, a computer program product includes a computer readable storage medium having program instructions embodied therewith. The embodied program instructions are executable by a processor to cause the processor to read, by the processor using the plurality of read transducers, encoded data from a plurality of tracks of a sequential access medium simultaneously. The embodied program instructions are further executable by the processor to cause the processor to determine, by the processor, that one or more tracks of the sequential access medium are dead within a sliding window. Moreover, the embodied program instructions are executable by the processor to cause the processor to rewrite, by the processor, a set of encoded data from the one or more dead tracks to one or more live tracks in a rewrite area of the sequential access medium.

Referring now to FIG. 1, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth hereinabove.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the network storage system 10 is shown in the form of a general-purpose computing device. The components of computer system/server 12 may include, but are not limited to, one or more processing units 16, a system memory 28, and a bus 18 that couples various system components including system memory 28 to processing unit(s) 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a HDD. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, and data archival storage systems, etc.

Figure 2A:
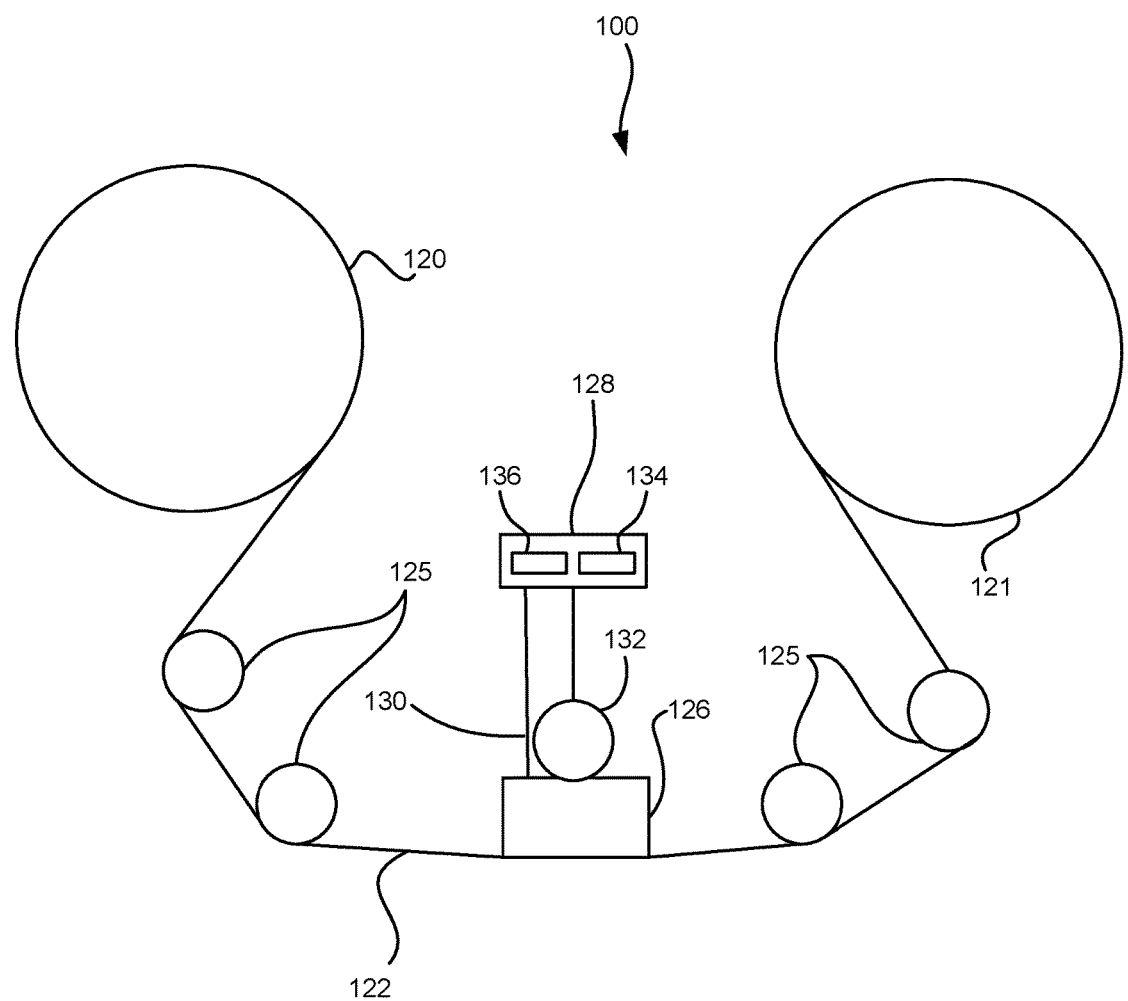
FIG. 2A illustrates a simplified tape drive of a tape-based data storage system, according to one embodiment.

FIG. 2A illustrates a simplified tape drive 100 of a tape-based data storage system, which may be employed in the context of the present invention. While one specific implementation of a tape drive is shown in FIG. 2A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 2A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the tape drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 2B:
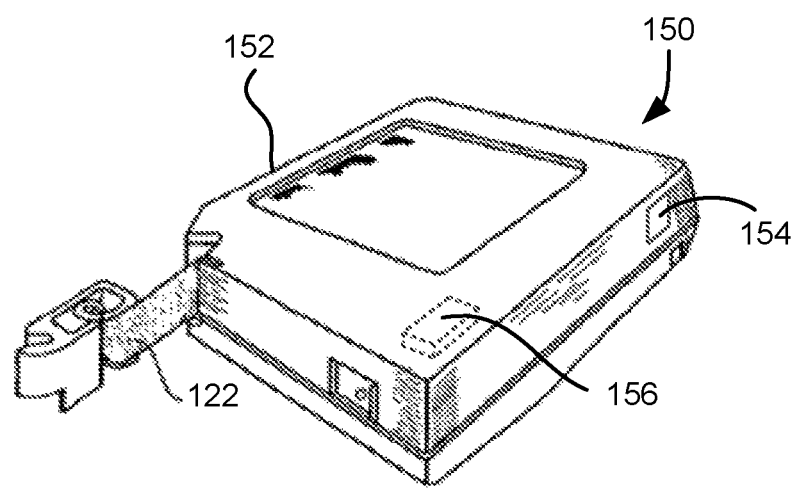
FIG. 2B is a schematic diagram of a tape cartridge according to one embodiment.

FIG. 2B illustrates an exemplary tape cartridge 150 according to one embodiment. Such tape cartridge 150 may be used with a system such as that shown in FIG. 2A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 2B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 3:
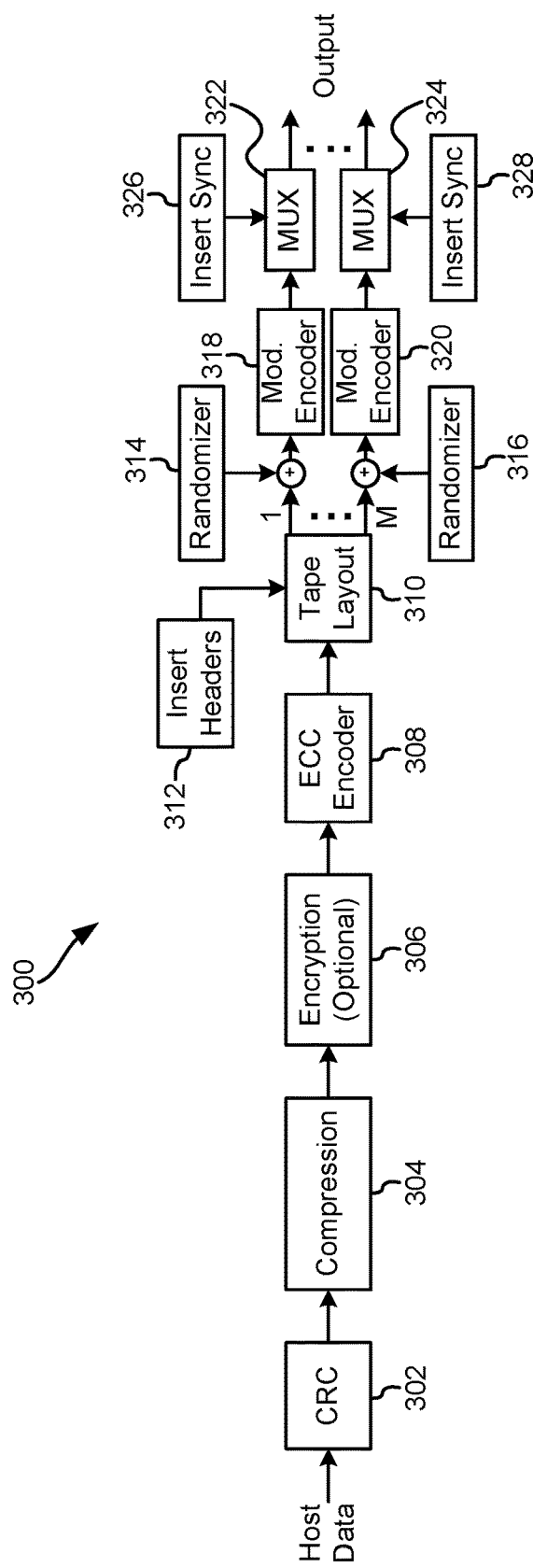
FIG. 3 illustrates a conceptual data flow in a tape drive in accordance with one embodiment.

FIG. 3 shows, in detailed form, a conceptual data flow 300 in a tape drive with M simultaneously written tracks via M write channels. The data flow 300 includes passing host data through a cyclic redundancy check (CRC) error detection encoder 302, a compression module 304, an optional encryption module 306, an error correction code (ECC) encoder 308 (which includes a C1 encoder and a C2 encoder, arranged as C1/C2, or C2/C1), and a tape layout module 310, according to one embodiment. The header insertion module 312 may be positioned as shown, feeding into the tape layout module 310, or may be positioned feeding into the ECC encoder 308, thereby allowing the headers to receive some amount of ECC encoding, in one embodiment. The tape layout module 310 splits the data into individual feeds for each channel 1, . . . , M to write to the tracks of the tape medium. The data flow 300 also includes scrambling the data (data randomization) 314, . . . , 316, modulation encoding 318, . . . , 320, synchronization insertion 326, . . . , 328, and multiplexing 322, . . . , 324 for each simultaneously written track 1, . . . , M.

In the following descriptions, most of these operations are not shown, in order to simplify descriptions. However, any of the descriptions herein may include additional operations not depicted, as would be understood by one of ordinary skill in the art upon reading the present descriptions. The number of tracks that may be written simultaneously depends on the tape drive being used, with the value of M ranging from 1 to 64 or more.

There are five types of overhead associated with data written on tape: error correction encoding at the ECC encoder 308, modulation encoding 318, . . . , 320, insertion of headers 312, insertion of synchronization patterns 326, . . . , 328, and rewriting of data following read-while-write. Approximately 79% format efficiency is achieved due to these primary forms of overhead, e.g., only 79 bits of data out of every 100 bits stored to tape correspond to user data, which is the data provided to the input of the ECC encoder 308. Moreover, a typical magnetic tape reserves about 3% of space for rewriting data.

Figure 4:
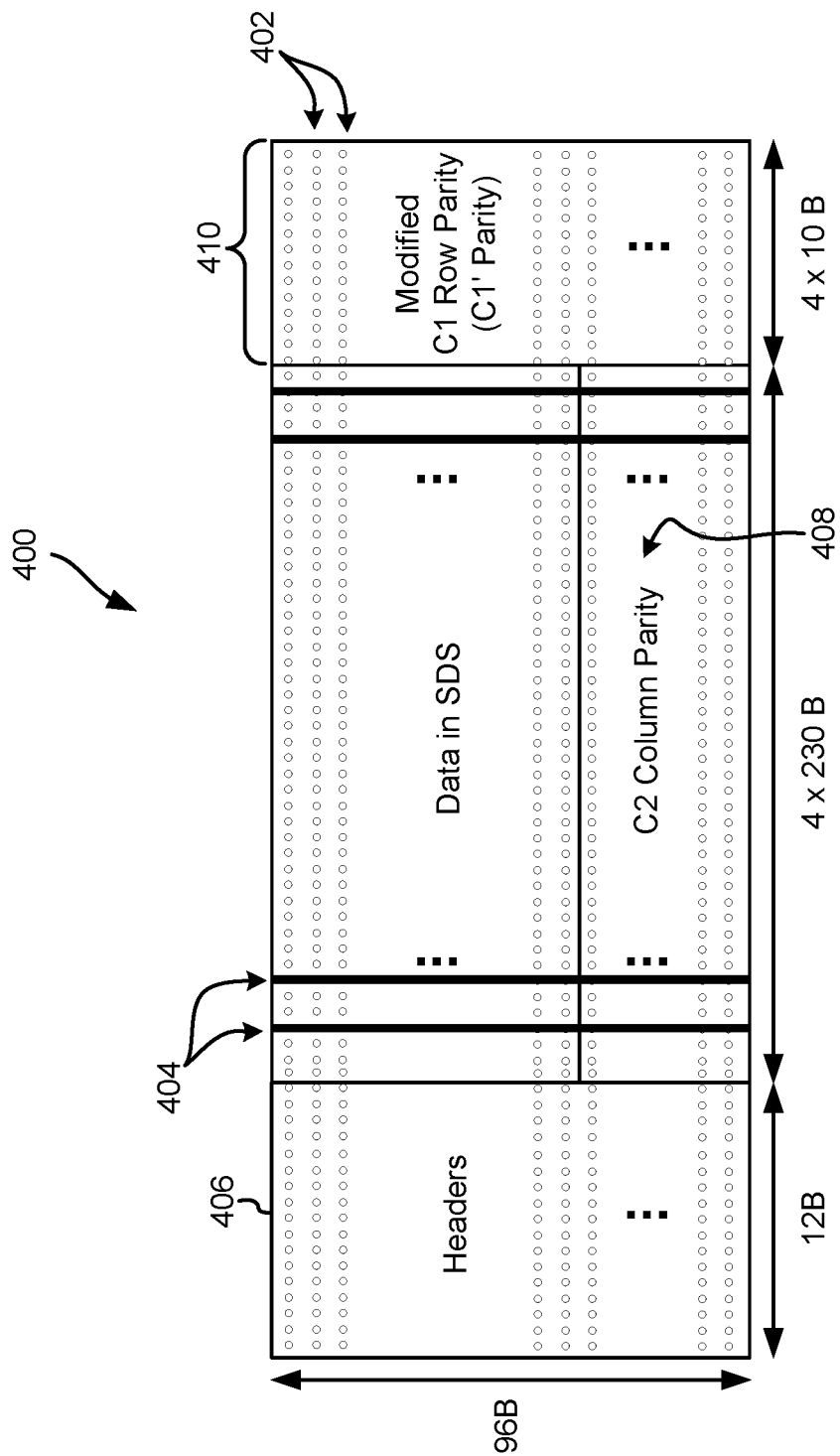
FIG. 4 shows a logical data array that may be used to organize data in a sub data set (SDS), according to one embodiment.

FIG. 4 shows a logical data array 400 that may be used to organize data in a sub data set (SDS), according to one embodiment. As shown, the data array includes a plurality of rows 402 and columns 404. Each row 402 in the data array 400 is a codeword interleave (CWI) that includes a plurality of C1 codewords. When the CWI includes four interleaved codewords, it is referred to as a CWI-4. The data in the SDS is protected by C1 encoding across each row 402 to produce C1 row parity (not shown as it is modified later to produce the data array 400), and by C2 encoding across each column 404 to produce C2 column parity 408.

As shown, the headers 406 for each row 402 may be encoded using a C1 encoding scheme by modifying the C1 parity (computed for the data in the row 402 only) to account for the headers 406 to produce C1' parity 410. In this embodiment, the headers 406 are protected by one-level ECC (C1' parity 410 only), whereas the data is protected by two-level ECC (C1' parity 410 and C2 parity 408).

Each data set includes multiple sub data sets and each sub data set may be represented by a logical two-dimensional array. Usually hundreds of headers are assigned to a single data set because each data set includes multiple SDSs and each row (which is typically a CWI) of a column-encoded SDS is assigned a header.

Currently-used linear tape drives simultaneously write and read up to 32 tracks to and/or from a magnetic tape medium. C1 row codewords of a product code are written in a byte-interleaved fashion onto individual tracks of the magnetic tape medium.

Figure 5:
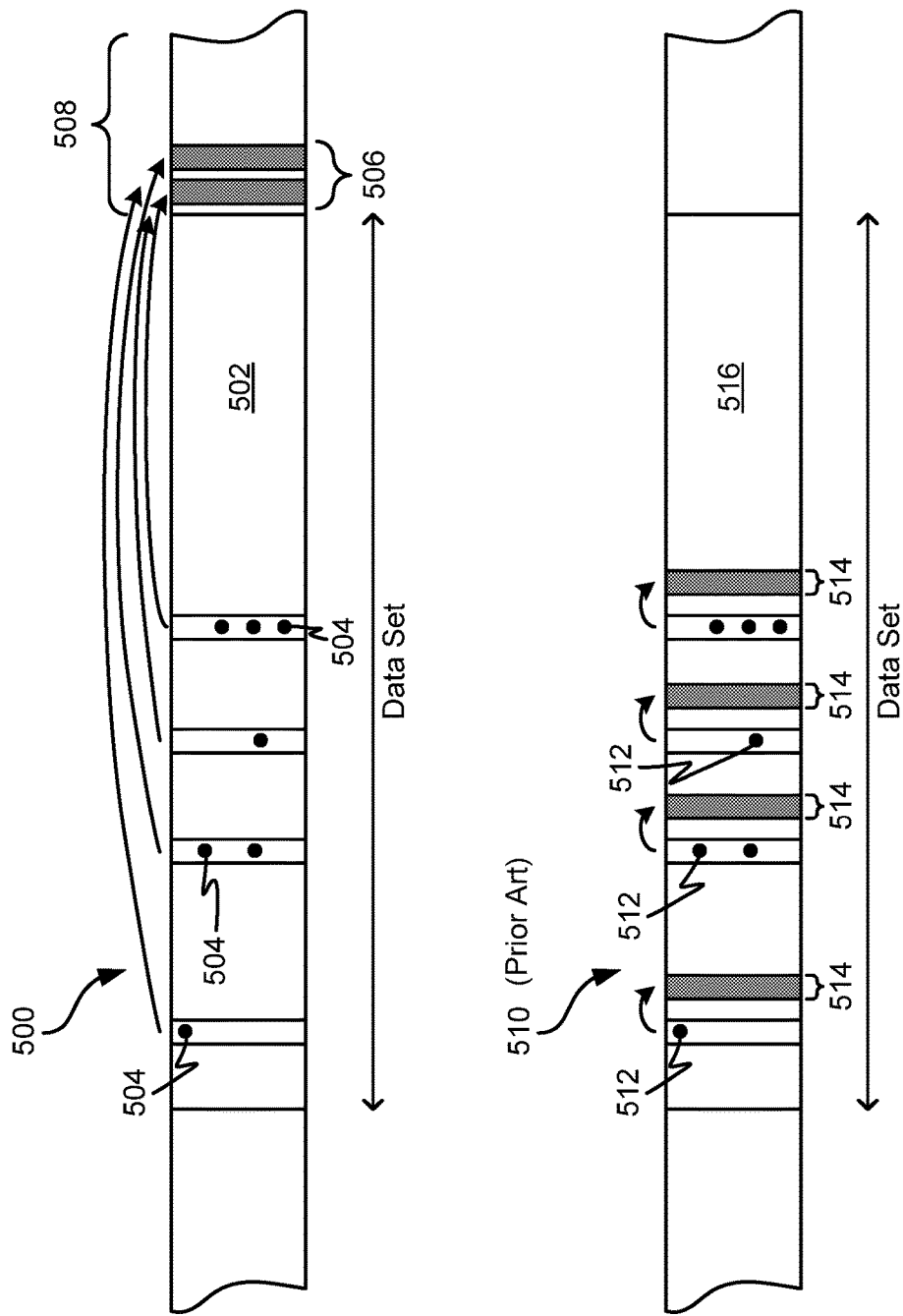
FIG. 5 shows a rewrite scheme according to an embodiment and a rewrite scheme according to the prior art.

Now referring to FIG. 5, a rewrite scheme 500 is shown according to one embodiment. In this rewrite scheme 500, in response to a data set 502 being written, all faulty data packets 504 detected during read-while write are collected in a large pool 506 and rewritten at the end of the data set in a rewrite area 508. This rewrite scheme 500 increases rewrite efficiency and therefore reduces the size of the rewrite area 508 on tape as compared to a conventional rewrite scheme 510 which rewrites faulty data packets 512 as soon as the faulty data packets 512 are detected in a plurality of rewrite areas 514 within the data set 516. Moreover, the tape cartridge capacity that is wasted as a result of at least one permanent dead track is reduced from about 50% for the conventional rewrite scheme 510 to about 4% using the disclosed rewrite scheme 500. In addition, the rewrite scheme 500 utilizes a rewrite algorithm that ensures large spacing between rewritten data packets taken from the same sub data set.

In one embodiment, an improved rewrite table that exhibits good ECC performance is provided, along with 32 FIFO buffers that are used to collect the faulty data packets to be rewritten at the end of the data set. For example, faulty data packets from SDS 2k and SDS 2k+1 are collected in buffer k, where k=0, 1, . . . , 31, for a 32-channel tape drive.

Figure 6:
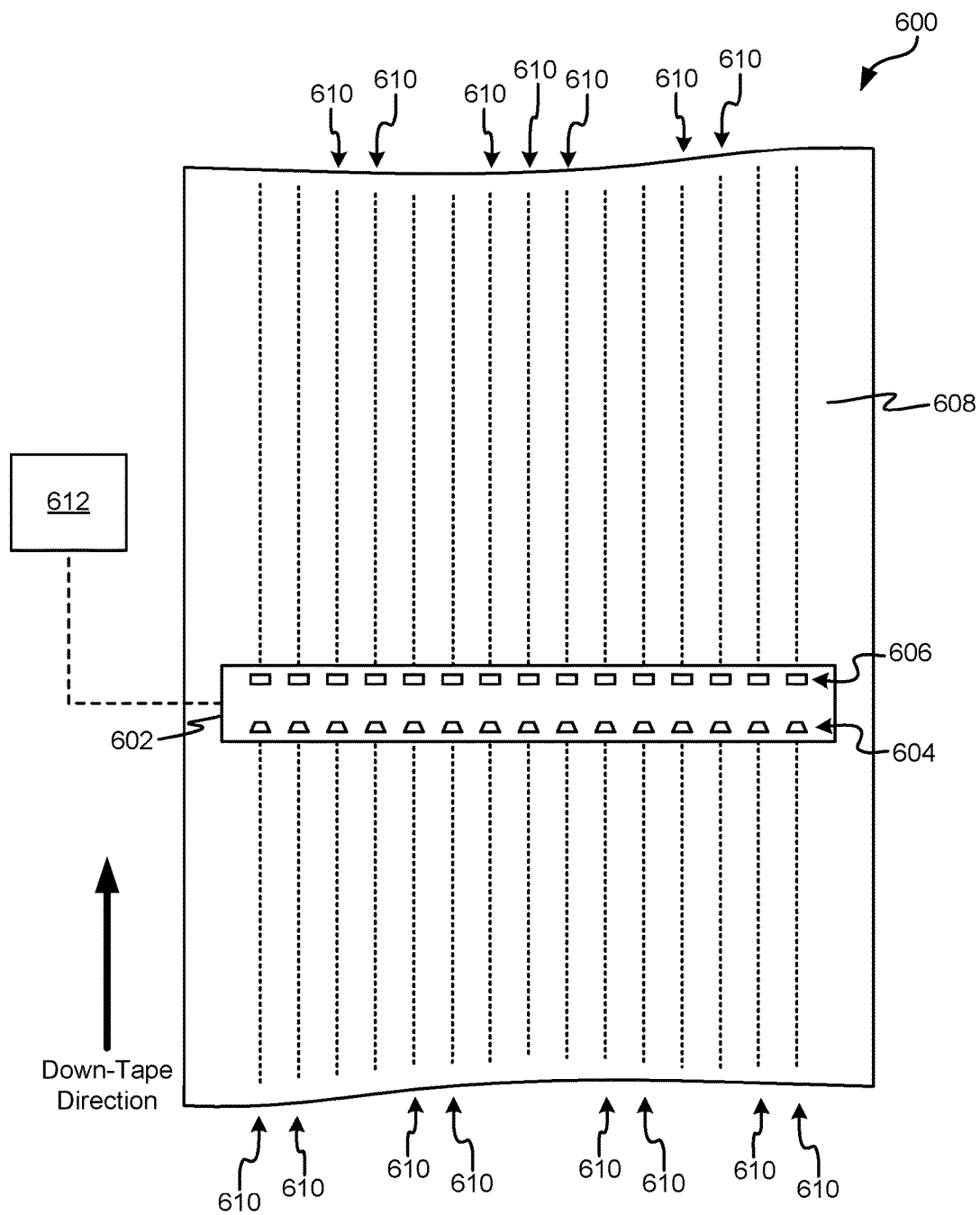
FIG. 6 shows a system for storing and reading data on a sequential access medium, according to one embodiment.

With reference to FIG. 6, a system 600 is shown according to one embodiment. The system 600 includes at least one magnetic head 602 that includes a plurality of write transducers 604 and a plurality of read transducers 606, with each read transducer 606 being positioned in a down-tape direction from a corresponding write transducer 604. Each read transducer 606 is configured to read data from one track of a magnetic tape medium 608 simultaneously with the other read transducers 606, thereby allowing a plurality of tracks 610 to be read simultaneously from the magnetic tape medium 608. The number of tracks 610 capable of being read simultaneously is equal to the number of read transducers 606 of the magnetic head 602. Of course, some read transducers 606 may be configured to read servo tracks for magnetic head alignment, and/or for other purposes, but for the sake of these descriptions, it is assumed that the read transducers 606 are each capable of reading data from the magnetic tape medium 608.

The system 600 also includes a hardware processor 612 and logic integrated with and/or executable by the hardware processor 612. The hardware processor 612 may be a hardware processing unit and/or circuit, such as a central processing unit (CPU), an application specific integrated circuit (ASIC), a field programmable gate array (FPGA), etc., combinations thereof, or any other suitable computing device known in the art. The logic may be implemented in software, hardware, or some combination thereof. In one embodiment, the logic is configured to read, using the plurality of read transducers, encoded data from a plurality of tracks of the sequential access medium simultaneously. In addition, the logic is configured to determine whether one or more tracks of the sequential access medium are dead within a sliding window. The logic is also configured to rewrite a set of encoded data from the one or more dead tracks to one or more live tracks in a rewrite area of the sequential access medium.

Figure 7:
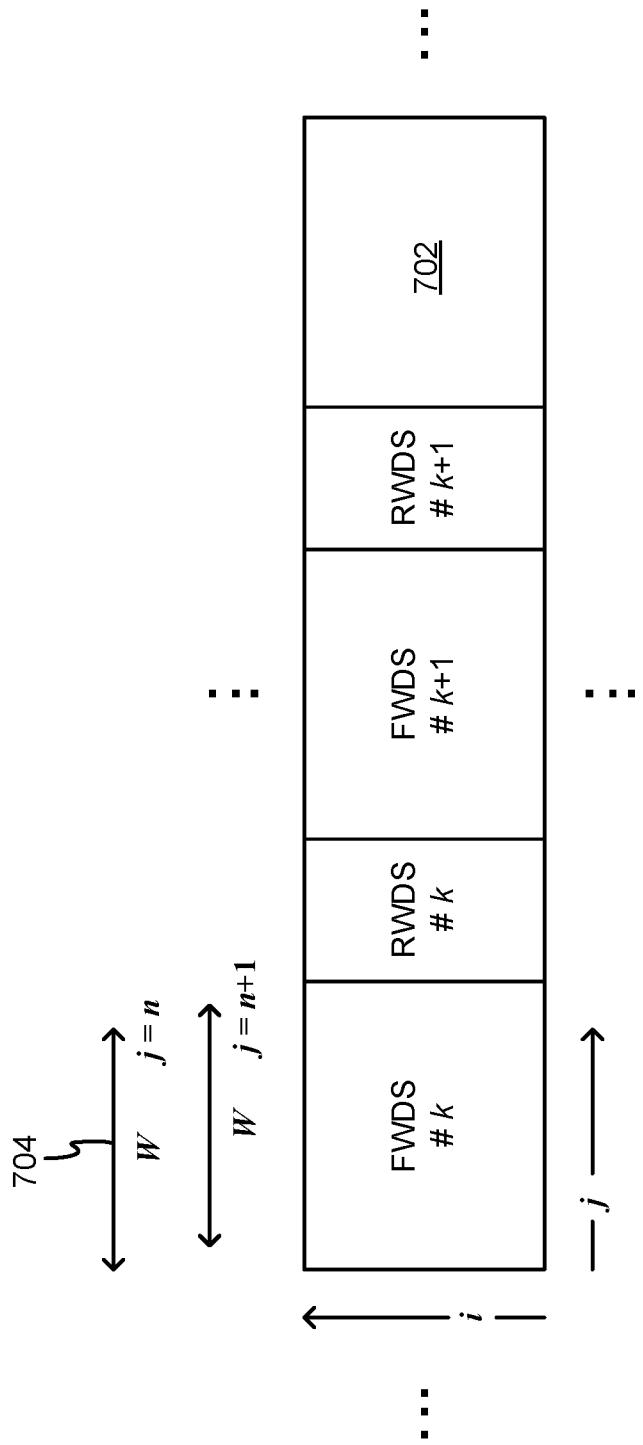
FIG. 7 shows dead track detection using a moving average-based quality assessment of data stored to a sequential access medium, according to one embodiment.

Referring now to FIG. 7, dead track detection is shown using a moving average based quality assessment of data stored to a sequential access medium, according to one embodiment. FIG. 7 shows a simplified portion of the sequential access medium 702 (such as a magnetic tape, optical discs like CD-ROM, DVD-ROM, etc.), with first-written data sets (FWDS) stored along a number of logical tracks of the sequential access medium 702 (each logical track is denoted as i, where $0 \leq i \leq M-1$). M denotes the number of channels of the system that writes data or the number of physical tracks of the sequential access medium 702 that are written simultaneously by the system, such as a tape drive, optical drive, etc. The logical tracks i are mapped onto the physical tracks of the sequential access medium 702. As shown, FWDS #k is written to the sequential access medium 702, followed by rewritten data set (RWDS) #k. Next, FWDS #k+1 is written to the sequential access medium 702, followed by RWDS #k+1, . . . , until the sequential access medium 702 is filled, or no more data is to be written. Each FWDS may have a size ranging from about 2 MB to about 25 MB, such as about 6 MB in one embodiment. Moreover, each RWDS will have a size dictated by the amount of data that is rewritten after a particular FWDS, and may have a maximum size in a range from about 4 MB to about 50 MB, such as about 12 MB in one embodiment.

A sliding window 704 decision period is used to determine whether dead tracks exist within data first written to the sequential access medium 702 within the sliding window 704. It has a size that spans W CWI sets along the sequential access medium 702 in the j direction. The size W of the sliding window 704 is a configurable value, and may be set to speed up a response time (which adds instability) or slow down a response time (which increases stability). In some embodiments, W may be set to 5, 10, 100, 1000, or some value therebetween to create a faster response time, or W may be set to 10,000, 15,000, 50,000, 100,000, or some value therebetween to create a slower response time.

The CWI set number along a particular track being recorded is indicated by j, which is also useful for denoting time during the recording process. A function $d(i,j)$ calculates a dead-track indication signal, where a dead track is indicated by $d(i,j)=0$, and a live track is indicated by $d(i,j)=1$, for a particular track i at any time j. Another function, $D(j)$ calculates the set of dead tracks for the sequential access medium 702 at time j, where $D(j)=\{i|d(i,j)=0\}$ for $0 \leq i \leq M-1$, at any time j. In other words, the set of tracks i at time j that satisfy $d(i,j)=0$ are dead.

According to one embodiment, function $d(i,j)$ and $D(j)$ may be represented for a sliding window where j=n as follows:
$d(i, n), 0 \leq i \leq M-1$ and $D(n)=\{i|d(i,n)=0, 0 \leq i \leq M-1\}$ According to another embodiment, function $d(i,j)$ and $D(j)$ may be represented for a sliding window where j=n+1 as follows:
$d(i,n+1), 0 \leq i \leq M-1$ and $D(n+1)=\{i|d(i,n+1)=0, 0 \leq i \leq M-1\}$ When using exponential averaging, as opposed to simple sliding window or moving averaging, a forgetting factor, $\alpha$, may be included in the determination of the set of dead tracks. The value of $\alpha$ is used to balance noisy signal quality issues, with a smaller $\alpha$ being used for noisy quality signals, and a higher $\alpha$ being used for consistent quality signals. The value of $\alpha$ may be adjusted dynamically based on changing operating conditions of the system, and may have a default value, such as 0.001, or smaller, in several embodiments.

Figure 8A:
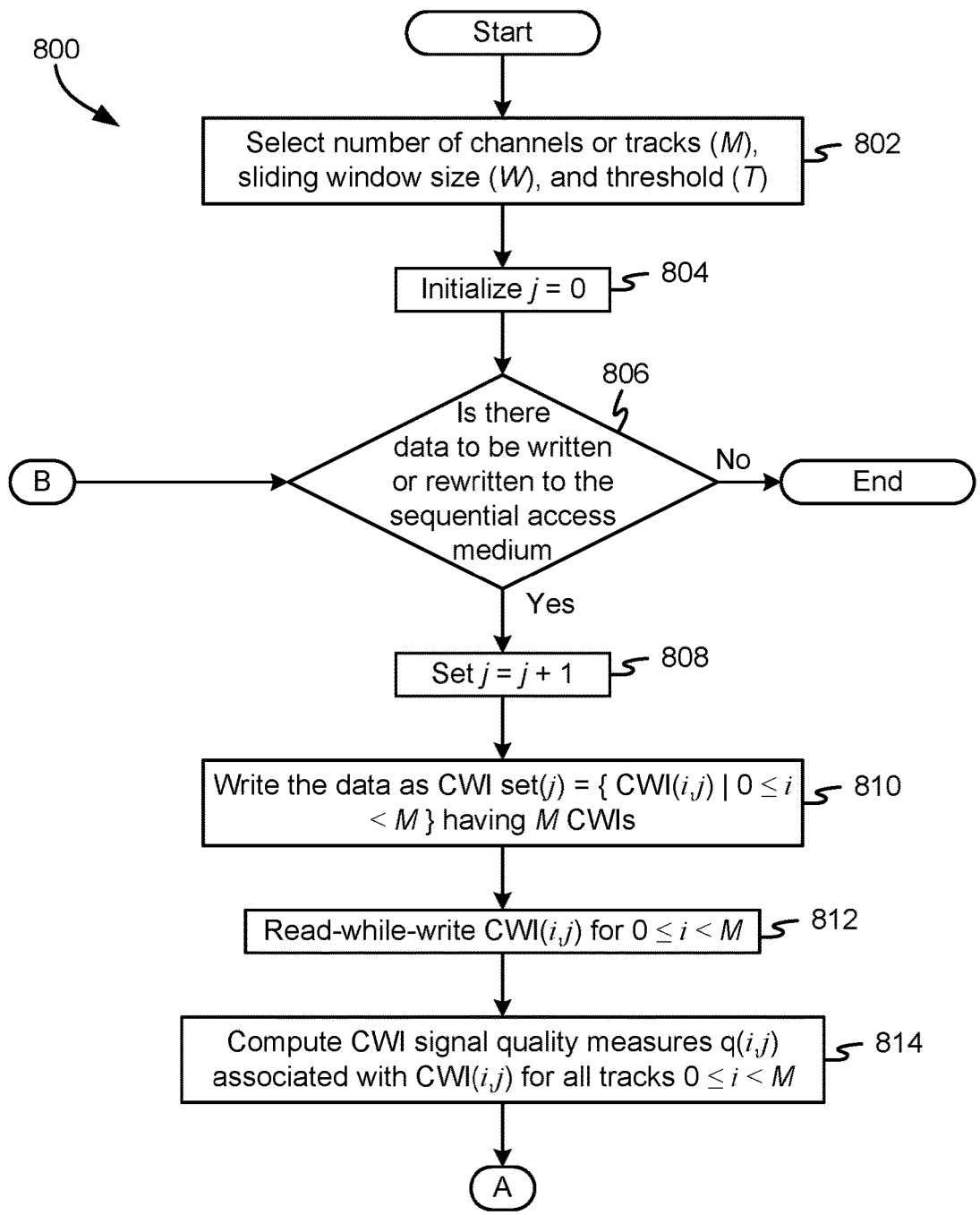
FIGS. 8A-8B show a method for sliding window averaging-based dead track detection, according to one embodiment.
Figure 8B:
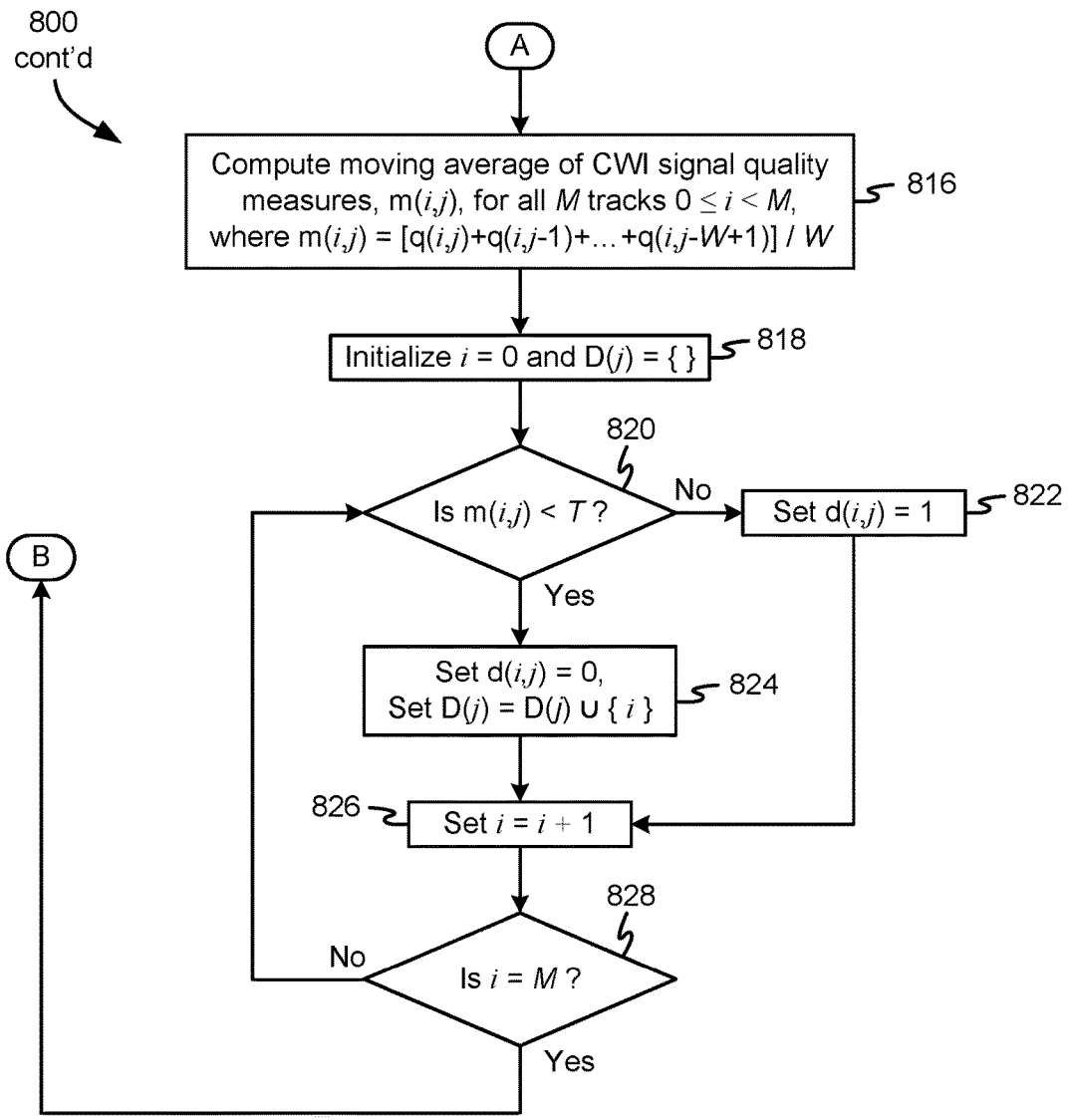

With the aid of the definitions of FIG. 7, and with reference to FIGS. 8A-8B, a method 800 for sliding window averaging-based dead track detection is shown according to one embodiment. The method 800 may be performed in accordance with the present invention in any of the environments depicted in FIGS. 1-7, among others, in various embodiments. Of course, more or less operations than those specifically described in FIGS. 8A-8B may be included in method 800, as would be understood by one of skill in the art upon reading the present descriptions.

Each of the steps of the method 800 may be performed by any suitable component of the operating environment. For example, in various embodiments, the method 800 may be partially or entirely performed by a controller, a processor, a tape drive, an optical drive, or some other device having one or more processors therein. The processor, e.g., processing circuit(s), chip(s), and/or module(s) implemented in hardware and/or software, and preferably having at least one hardware component, may be utilized in any device to perform one or more steps of the method 800. Illustrative processors include, but are not limited to, a CPU, an ASIC, a FPGA, etc., combinations thereof, or any other suitable computing device known in the art.

As shown in FIG. 8A, method 800 may initiate with operation 802, where a number of channels or tracks, M, is selected over which the dead track detection will be performed. Moreover, the sliding window size, W, and a moving average threshold parameter T are selected. The moving average threshold parameter T is a user selected parameter that dictates when the quality of the recorded data falls below a desired level.

In operation 804, the CWI set number and time measure, j, is initialized to equal zero. The value that j will equal over the course of the execution of method 800 depends on the arrangement of the system and sequential access medium (e.g., magnetic tape). In one embodiment, j may occupy values in a range of <1,192>, after j is initialized at zero and incremented during processing.

In operation 806, a decision is made as to whether any data (e.g., CWIs) are to be written or rewritten on the sequential access medium. If there is data to be written or rewritten, method 800 continues to operation 808; otherwise, method 800 is ended.

In operation 808, j is incremented by one, e.g., j→j+1.

In operation 810, the data is written to the sequential access medium. In one embodiment, a number of CWIs are written as follows: CWI set $(j)=\{CWI(i,j)|0 \leq i<M\}$.

In operation 812, the just-written data is read in a read-while-write process. In one embodiment, all $CWI(i,j)$ are read for $0 \leq i<M$, which defines the current sliding window size for analysis.

In operation 814, a signal quality measure $q(i,j)$ for the written data is computed within the sliding window. In one embodiment, the $q(i,j)$ is associated with $CWI(i,j)$ for all tracks $0 \leq i \leq M$.

Now referring to FIG. 8B, a moving average $m(i,j)$ of the signal quality measures is computed for all tracks within the sliding window in operation 816. In one embodiment, $m(i,j)=[q(i,j)+q(i,j-1)+ \ldots +q(i,j-W+1)]/W$ for $0 \leq i<M$.

After the moving average $m(i,j)$ of the signal quality measures is computed, in operation 818, a counter of the logical track number, i, is initialized as zero (e.g., i=0) and the set of dead tracks within the sliding window, $D(j)$, is set to be empty (e.g., $D(j)=\{\ \}$).

In operation 820, it is determined whether the moving average $m(i,j)$ of the signal quality measures is less than a threshold, T. The threshold is user selectable, and may have any value that is consistent with producing good, repeatable data from the tracks of the sequential access medium. If $m(i,j)$ is greater than or equal to the threshold T, method 800 continues to operation 822 where the flag indicating a dead track, $d(i,j)$, is set equal to one (e.g., $d(i,j)=1$), which indicates that the track is not dead, but instead is a live track; otherwise, in response to $m(i,j)$ being less than the threshold T indicating poor quality of data, method 800 moves to operation 824 to indicate a dead track.

In operation 824, the flag indicating a dead track, $d(i,j)$, is set to zero to indicate a dead track, and the set of dead tracks, $D(j)$, has the current track added thereto (e.g., $D(j)=D(j) \cup \{i\}$).

After either of operation 822 and 824, the counter of the logical track number, i, is incremented by one (e.g., i→i+1) in operation 826. Then, in operation 828, it is determined whether the signal quality of all tracks in the sliding window have been analyzed (e.g., i=M). In response to all tracks in the sliding window being analyzed (e.g., i=M), method 800 returns to operation 806 in FIG. 8A to find more data to be written or rewritten, or to end. In response to more tracks in the sliding window having not yet been analyzed (e.g., i<M), method 800 returns to operation 820 in FIG. 8B to determine a signal quality of a next track in the sliding window.

Using method 800 as described in FIGS. 8A-8B, the signal quality of each track within a sliding window having a size of M tracks is able to be analyzed using a moving average calculation of the signal quality, to filter out single track errors, and provide a conclusion as to whether an entire track or channel is experiencing a read and/or write issue preventing quality data from being stored and/or read therefrom in a consistent basis.

In another embodiment, exponential averaging may be used for determination of dead track(s) on a sequential access medium. With the aid of the definitions of FIG. 7, and with reference to FIGS. 9A-9B, a method 900 for exponential averaging-based dead track detection is shown according to this embodiment. The method 900 may be performed in accordance with the present invention in any of the environments depicted in FIGS. 1-7, among others, in various embodiments. Of course, more or less operations than those specifically described in FIGS. 9A-9B may be included in method 900, as would be understood by one of skill in the art upon reading the present descriptions.

Each of the steps of the method 900 may be performed by any suitable component of the operating environment. For example, in various embodiments, the method 900 may be partially or entirely performed by a controller, a processor, a tape drive, an optical drive, or some other device having one or more processors therein. The processor, e.g., processing circuit(s), chip(s), and/or module(s) implemented in hardware and/or software, and preferably having at least one hardware component, may be utilized in any device to perform one or more steps of the method 900. Illustrative processors include, but are not limited to, a CPU, an ASIC, a FPGA, etc., combinations thereof, or any other suitable computing device known in the art.

Figure 9A:
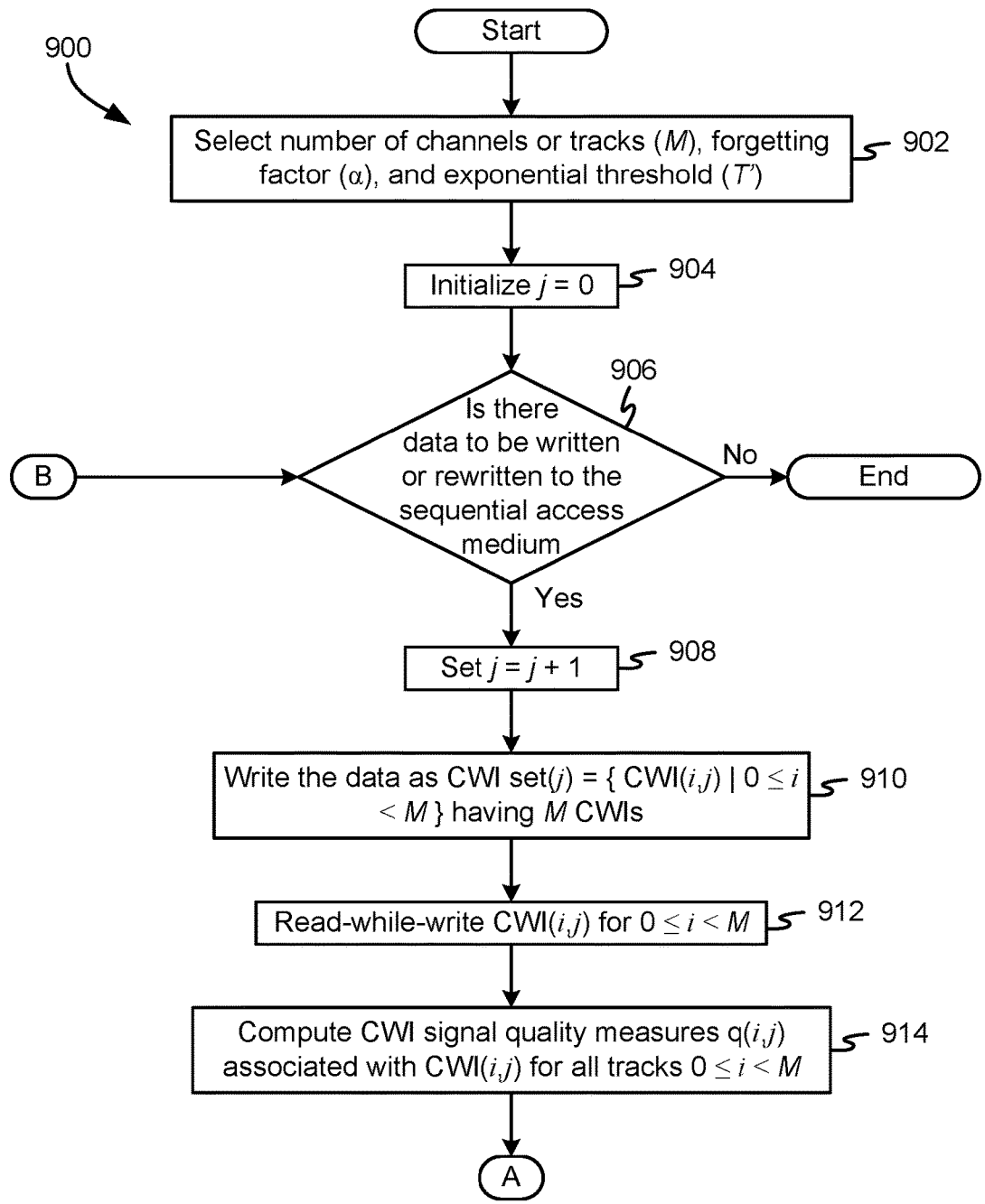
FIGS. 9A-9B shows exponential averaging for determination of dead tracks on a sequential access medium, in accordance with an embodiment.

As shown in FIG. 9A, method 900 may initiate with operation 902, where a number of channels or tracks, M, is selected over which the dead track detection will be performed. Moreover, a forgetting factor, $\alpha$, is set, and an exponential threshold T' is selected. The exponential threshold T' is a user selected parameter that dictates when the quality of the recorded data falls below a desired level.

In operation 904, the CWI set number and time measure, j, is initialized to equal zero. The value that j will equal over the course of the execution of method 900 depends on the arrangement of the system and sequential access medium (e.g., magnetic tape). In one embodiment, j may occupy values in a range of <1,192>, after j is initialized at zero and incremented during processing.

In operation 906, a decision is made as to whether any data (e.g., CWIs) are to be written or rewritten on the sequential access medium. If there is data to be written or rewritten, method 900 continues to operation 908; otherwise, method 900 is ended.

In operation 908, j is incremented by one, e.g., j→j+1.

In operation 910, the data is written to the sequential access medium. In one embodiment, a number of CWIs are written as follows: CWI set (j)={CWI(i,j)|0≤i<M}.

In operation 912, the just-written data is read in a read-while-write process. In one embodiment, all CWI(i,j) are read for 0≤i<M, which defines the number of channels or tracks being analyzed.

In operation 914, a signal quality measure q(i,j) for the written data is computed for all tracks 0≤i<M.

Figure 9B:
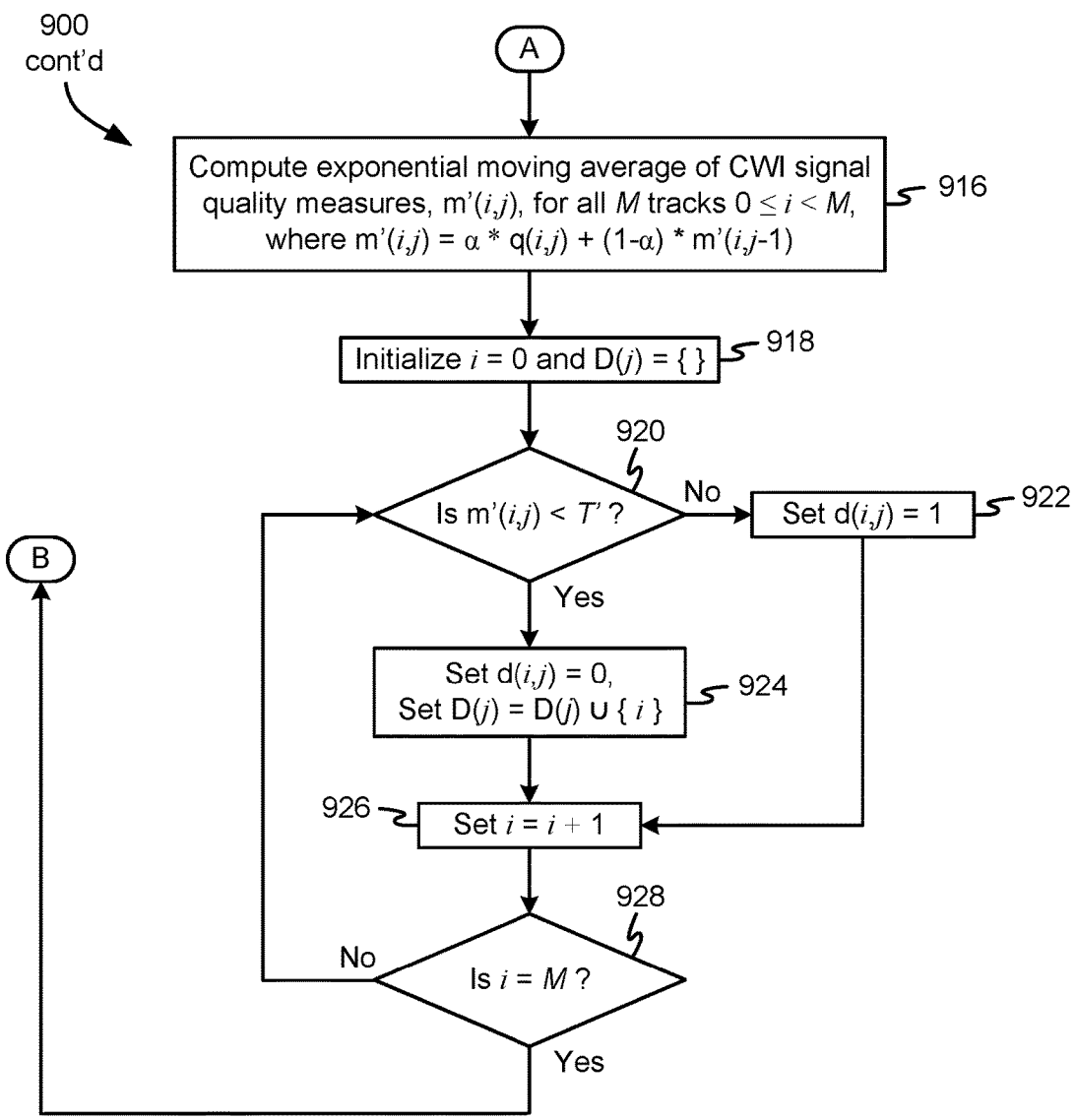

Now referring to FIG. 9B, an exponential average m'(i,j) of the signal quality measures is computed for all tracks in operation 916. In one embodiment, m'(i,j)=$\alpha$*q(i,j)+(1−$\alpha$)*m'(i,j−1) for 0≤i<M.

After the exponential average m'(i,j) of the signal quality measures is computed, in operation 918, a counter of the logical track number, i, is initialized as zero (e.g., i=0) and the set of dead tracks, D(j), is set to be empty (e.g., D(j)={ }).

In operation 920, it is determined whether the exponential average m'(i,j) of the signal quality measures is less than the exponential threshold, T'. The exponential threshold is user selectable, and may have any value that is consistent with producing good, repeatable data from the tracks of the sequential access medium. If m'(i,j) is greater than or equal to the exponential threshold T', method 900 continues to operation 922 where the flag indicating a dead track, d(i,j), is set equal to one (e.g., d(i,j)=1), which indicates that the track is not dead, but instead is a live track; otherwise, in response to m'(i,j) being less than the exponential threshold T' indicating poor quality of data, method 900 moves to operation 924 to indicate a dead track.

In operation 924, the flag indicating a dead track, d(i,j), is set to zero to indicate a dead track, and the set of dead tracks, D(j), has the current track added thereto (e.g., D(j)=D(j)∪{i}).

After either of operation 922 and 924, the counter of the logical track number, i, is incremented by one (e.g., i→i+1) in operation 926. Then, in operation 928, it is determined whether the signal quality of all tracks have been analyzed (e.g., i=M). In response to all tracks being analyzed (e.g., i=M), method 900 returns to operation 906 in FIG. 9A to find more data to be written or rewritten, or to end. In response to more tracks having not yet been analyzed (e.g., i<M), method 900 returns to operation 920 in FIG. 9B to determine a signal quality of a next track.

Using method 900 as described in FIGS. 9A-9B, the signal quality of each track up to a selectable number of tracks equal to M is able to be analyzed using an exponential average calculation of the signal quality, to filter out single track errors, and provide a conclusion as to whether an entire track or channel is experiencing a read and/or write issue preventing quality data from being stored and/or read therefrom in a consistent basis.

Figure 10A:
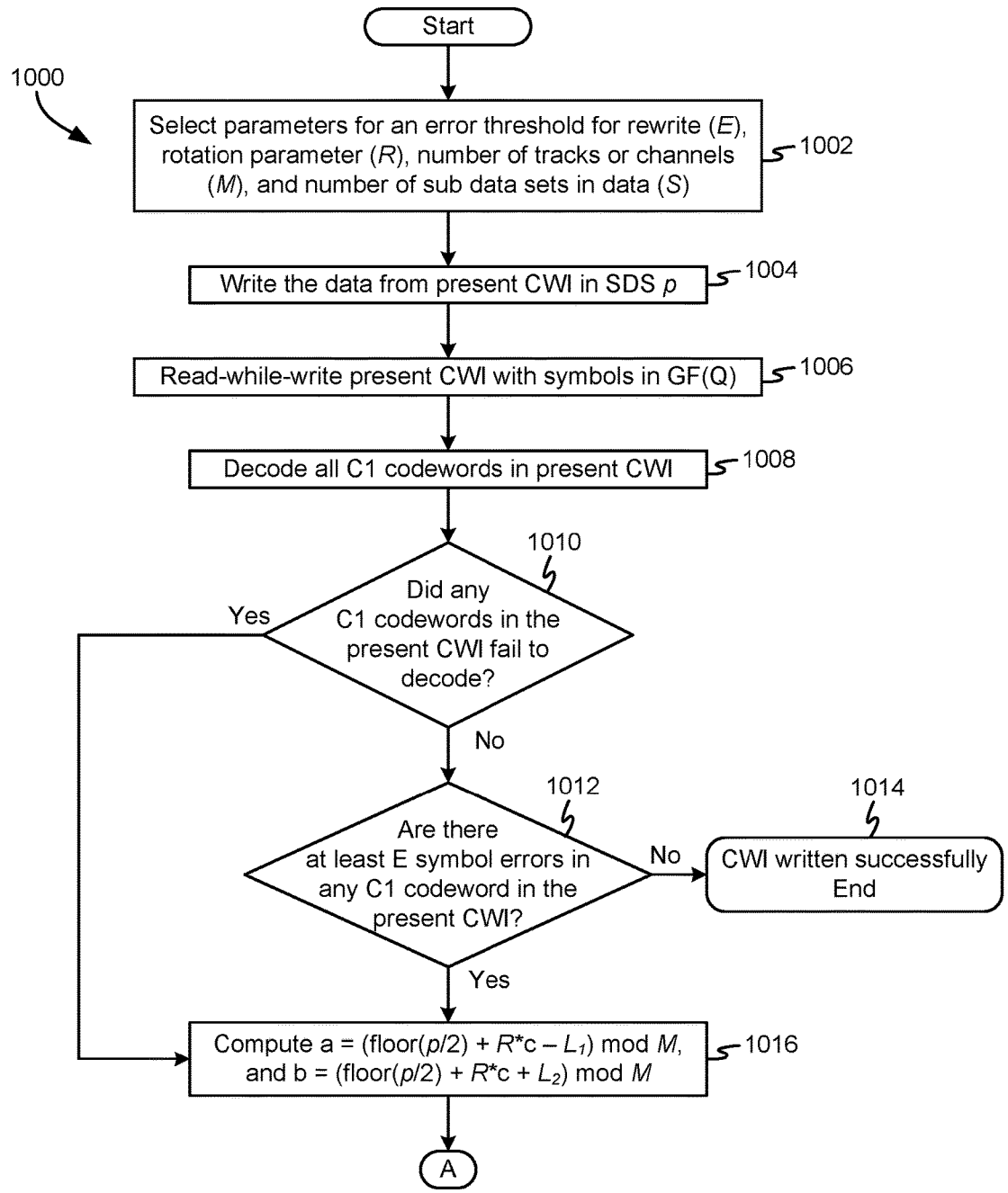
FIGS. 10A-10B shows a method for rewriting data to a sequential access medium after performing moving-average dead track detection, according to one embodiment.
Figure 10B:
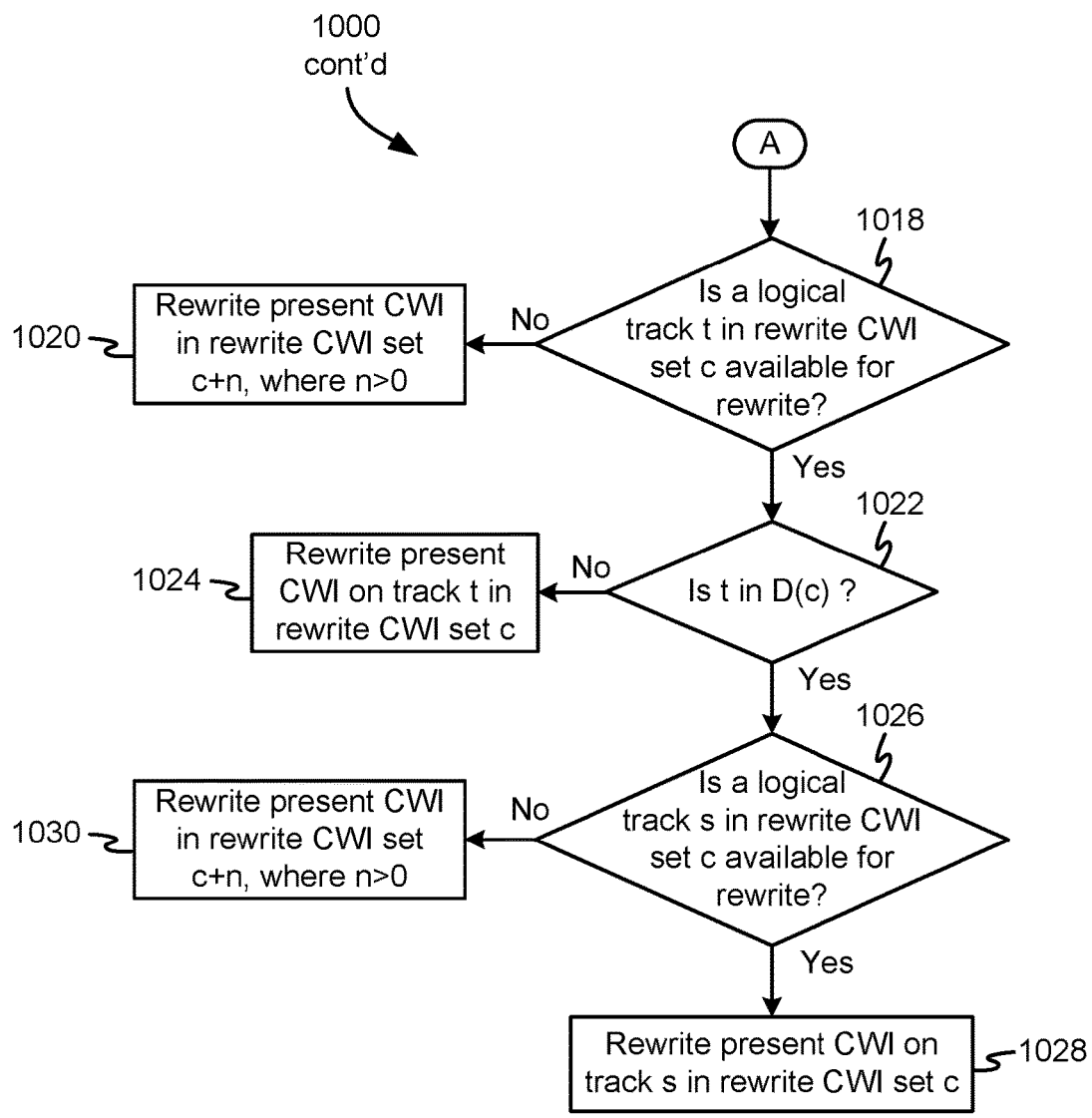

Now referring to FIGS. 10A-10B, a method 1000 for rewriting data to the sequential access medium after performing moving-average dead track detection is shown according to one embodiment. The method 1000 may be performed in accordance with the present invention in any of the environments depicted in FIGS. 1-7, among others, in various embodiments. Of course, more or less operations than those specifically described in FIGS. 10A-10B may be included in method 1000, as would be understood by one of skill in the art upon reading the present descriptions. Parameters which are denoted by capital letters are constants throughout the calculations of method 1000, while lower case denoted parameters are variables.

Each of the steps of the method 1000 may be performed by any suitable component of the operating environment. For example, in various embodiments, the method 1000 may be partially or entirely performed by a controller, a processor, a tape drive, an optical drive, or some other device having one or more processors therein. The processor, e.g., processing circuit(s), chip(s), and/or module(s) implemented in hardware and/or software, and preferably having at least one hardware component, may be utilized in any device to perform one or more steps of the method 1000. Illustrative processors include, but are not limited to, a CPU, an ASIC, a FPGA, etc., combinations thereof, or any other suitable computing device known in the art.

As shown in FIG. 10A, method 1000 may initiate with operation 1002, where four parameter values, E, R, M, and S, are set, according to preferences of the user, desired results, specifics of the drive operating the sequential access medium, and/or the sequential access medium itself. E is used to denote an error threshold for rewrite, and may be set according to the number of errors within C1 codewords in a CWI as a result of C1 decoding during read-while-write which triggers a rewrite of the CWI. In various approaches, E may be set in a range from 1 to 16, such as 4 in one embodiment. R is used to denote a rotation parameter for rewrite, which indicates how data is rewritten to tracks of the sequential access medium during rewrite, and is understood by those of skill in the art. In various approaches, R may be set from 0 to 31, such as 15 in one embodiment. M is used to denote the number of channels, and is reliant on the drive being used. In one embodiment, M may be set to 32. In another embodiment, M may be set to 64. S indicates a number of sub data sets in the data sample being analyzed. In one embodiment, S=2*M.

In operation 1004, data is written to the sequential access medium. In one embodiment, the data is organized in a CWI from SDS numbered p encoded by a Reed-Solomon (RS) code $RS(N_1, K_1)$, and the CWI includes I symbol-interleaved C1 codewords over GF(Q).

The value of p may take any value within the range $0 \leq p < S$, across the range of sub data sets being analyzed. In one embodiment, I may be set to 4, but may be set to any suitable number of interleaved codewords as would be understood by one of skill in the art.

The Galois field (GF) may have any suitable number of symbols Q. In one embodiment, Q may be set to 256, but may have any value known in the art, such as 64, 128, 512, 1024, etc. According to one embodiment, $N_1$, may be set to 240, but may take any suitable value known in the art. In another embodiment, $K_1$ may be set to 228, but may take any suitable value known in the art.

In operation 1006, the just-written CWI is read in a read-while-write process. In operation 1008, all codewords in the CWI are decoded to determine C1 codewords encoded therein.

In operation 1010, it is determined whether any C1 codewords within the CWI failed to decode. In response to failure to decode at least one C1 codeword in a CWI from sub data set p, method 1000 jumps to operation 1016; otherwise, in response to all C1 codewords in CWI from sub data set p decoding successfully, method 1000 continues to operation 1012.

In operation 1012, it is determined whether the number of symbol errors within any single decoded C1 codeword is equal to or greater than E (e.g., # errors for C1 codeword $\geq$E). In response to no C1 codewords including at least E symbol errors therein, method 1000 moves to operation 1014; otherwise, in response to at least one C1 codeword including at least E symbol errors therein, method 1000 continues to operation 1016.

In operation 1014, it is determined that the CWI was written successfully, and that no rewriting is deemed advantageous. Therefore, method 1000 ends.

In operation 1016, two boundaries are computed, a first bound, a, and a second bound, b. In one embodiment, $a=(\text{floor}(p/2)+R*c-L_1) \mod M$, and $b=(\text{floor}(p/2)+R*c+L_2) \mod M$, where c is a number of the present rewritten CWI and $0 \leq c$, $L_1$ is a nonnegative constant (e.g., 0, 1, 2, etc.), $L_2$ is a nonnegative constant (e.g., 0, 1, 2, etc.), and either a<b, or a>b, i.e., a≠b. In one embodiment, $L_1+L_2>0$.

Now referring to FIG. 10B, in operation 1018, it is determined whether a logical track, t, in the rewrite CWI set, c, is available for rewrite, where ($a \leq t \leq b$ if a<b) and ($t \geq a$ or $t \leq b$ if b<a). In one embodiment, $0 \leq t < M$. A logical track is not available for rewrite in response to a determination that another CWI in the present SDS p has already been scheduled to be rewritten in the rewrite CWI set c on a live track t.

In response to no logical tracks in the present rewrite CWI set c being available for rewrite, method 1000 moves to operation 1020; otherwise, in response to logical track t being available for rewrite in rewrite CWI set c, method 1000 continues to operation 1022.

In operation 1020, the present CWI is rewritten on a track in rewrite CWI set c+n, where n>0. In other words, the present CWI is rewritten in a portion of the rewrite area following the portion of the rewrite area being used to rewrite the present rewrite CWI c.

In operation 1022, it is determined whether logical track tin rewrite CWI set c is included in the set of dead tracks, e.g., is tin D(c)? In response to a determination that logical track tin rewrite CWI set c is not included in the set of dead tracks, in operation 1024, the present CWI is rewritten on track tin rewrite CWI set c.

In operation 1026, in response to a determination that logical track tin rewrite CWI set c is part of the set of dead tracks, it is determined whether a different logical track s is available for rewrite in CWI set c. In this determination, ($a \leq s \leq b$ and s is not in D(c) if a<b), and either a<b, or a>b, i.e., a≠b. If a>b, s is determined such that $a \leq s$ or $s \leq b$ and the condition s is not in D(c) is satisfied. Note that $0 \leq s < M$, since s is a logical track number.

In response to a determination that a different logical track s is available for rewrite in CWI set c, the present CWI is rewritten on track s in rewrite CWI set c in operation 1028. Otherwise, in operation 1030, in response to a determination that another logical track s is not available for rewrite in CWI set c, the present CWI is rewritten on a track in rewrite CWI set c+n, where n>0.

When dead tracks are caused by non-functional read transducers, it may be beneficial to rewrite data from the identified dead tracks on a live track in addition to a dead track in a first tape drive (instead of rewriting no data on the dead tracks). One reason for this duplication is that when a tape cartridge that has been rewritten this way is inserted into a second tape drive that has functional read transducers, the data rewritten on the dead track (which was caused by faulty read transducers and not a problem with the track of the tape) is able to be read now because the read transducers in the second tape drive are functional. Therefore, the CWI rewritten twice on a dead track and on a live track in a first tape drive are able to be read twice in the second tape drive and encoded data in the CWI may be read more reliably with the second tape drive. This technique of writing data two or more times is known in the art as "repetition coding." Note that in this scenario the data that is being written (and rewritten) in the first tape drive is read in the second tape drive.

Figure 11:
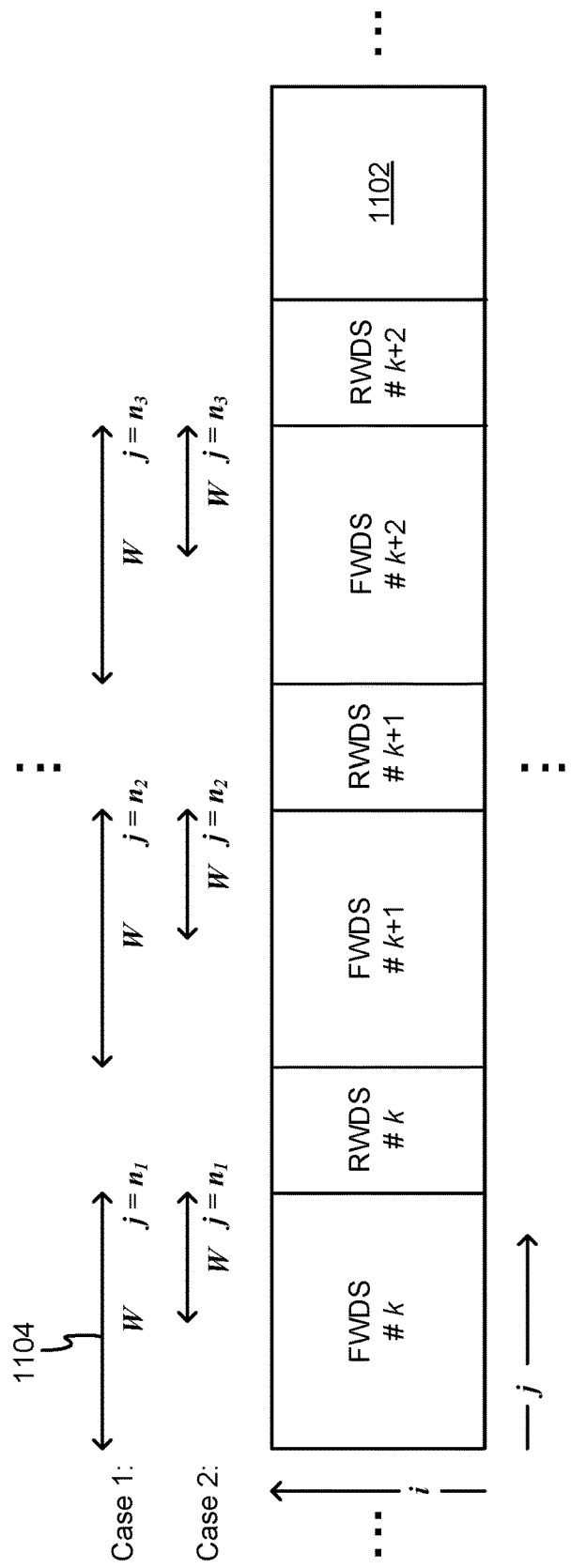
FIG. 11 shows dead track detection using data set-based quality assessment of data stored to a sequential access medium, according to one embodiment.

Now referring now to FIG. 11, dead track detection is shown using data set-based quality assessment of data stored to a sequential access medium, according to one embodiment. FIG. 11 shows a simplified portion of the sequential access medium 1102 (such as a magnetic tape, optical discs like CD-ROM, DVD-ROM, etc.), with first-written data sets (FWDS) stored along a number of logical tracks of the sequential access medium 1102 (each logical track is denoted as i, where 0≤i≤M−1). M denotes the number of channels of the system that writes data or the number of physical tracks of the sequential access medium 1102 that are written simultaneously by the system, such as a tape drive, optical drive, etc. The logical tracks i are mapped onto the physical tracks of the sequential access medium 1102. As shown, FWDS #k is written to the sequential access medium 1102, followed by rewritten data set (RWDS) #k. Next, FWDS #k+1 is written to the sequential access medium 1102, followed by RWDS #k+1, . . . , until the sequential access medium 1102 is filled, or no more data is to be written. Each FWDS may have a size ranging from about 2 MB to about 25 MB, such as about 6 MB in one embodiment. Moreover, each RWDS will have a size dictated by the a mount of data that is rewritten after a particular FWDS, and may have a maximum size in a range from about 4 MB to about 50 MB, such as about 12 MB in one embodiment.

A sliding window 1104 decision period is used to determine whether dead tracks exist within data first written to the sequential access medium 1102 within the sliding window 1104. It has a size that spans W CWI sets along the sequential access medium 1102 in the j direction. At the end of FWDS #k, $j=n_1$, at the end of FWDS #k+1, $j=n_2$, at the end of FWDS #k+2, $j=n_3$, etc.

The CWI set number along a particular track being recorded is indicated by j, which is also useful for denoting time during the recording process. The function $d_k(i)$ calculates a dead-track indication signal, where $d_k(i)=0$ indicates a dead track, and $d_k(i)=1$ indicates a live track, associated with FWDS #k. Another function, $D_k$ calculates the set of dead tracks for the sequential access medium 1102 associated with FWDS #k. The dead-track indication signal $d_k(i)$ computed over FWDS #k does not change over RWDS #k.

The number of CWI sets that the sliding window spans, W, may be user selectable to cause faster or slower responses to dead tracks and improve stability of the feedback signal. In various approaches, $W=2N_2$ (Case 1), $W=N_2$ (Case 2), $W=N_2/2$ (Case 3), etc., where $N_2$ is representative for the RS code used to encode C2 codewords, e.g., a $RS(N_2,K_2)$ code is used to encode C2 codewords of length $N_2$ symbols on the sequential access medium. Any suitable values may be used for $N_2$ and $K_2$ as would be understood by one of skill in the art. In one embodiment, $N_2=192$ and $K_2=168$.

Moreover, each data set is written over M tracks (or channels) of the sequential access medium, in a first written data set, L CWIs are written on each track, each CWI includes I symbol-interleaved C1 codewords and therefore has a length of $I*N_1$ symbols, an $RS(N_1,K_1)$ Reed-Solomon code is used to encode C1 codewords with any suitable values used for $N_1$ and $K_1$ as would be understood by one of skill in the art. In one embodiment, $N_1=240$ and $K_1=228$.

According to one embodiment, I may be set to any positive integer, such as 1, 2, 3, 4, 6, 8, etc. Also, a number of CWI sets in a $FWDS=L=S*N_2/M$.

Figure 12A:
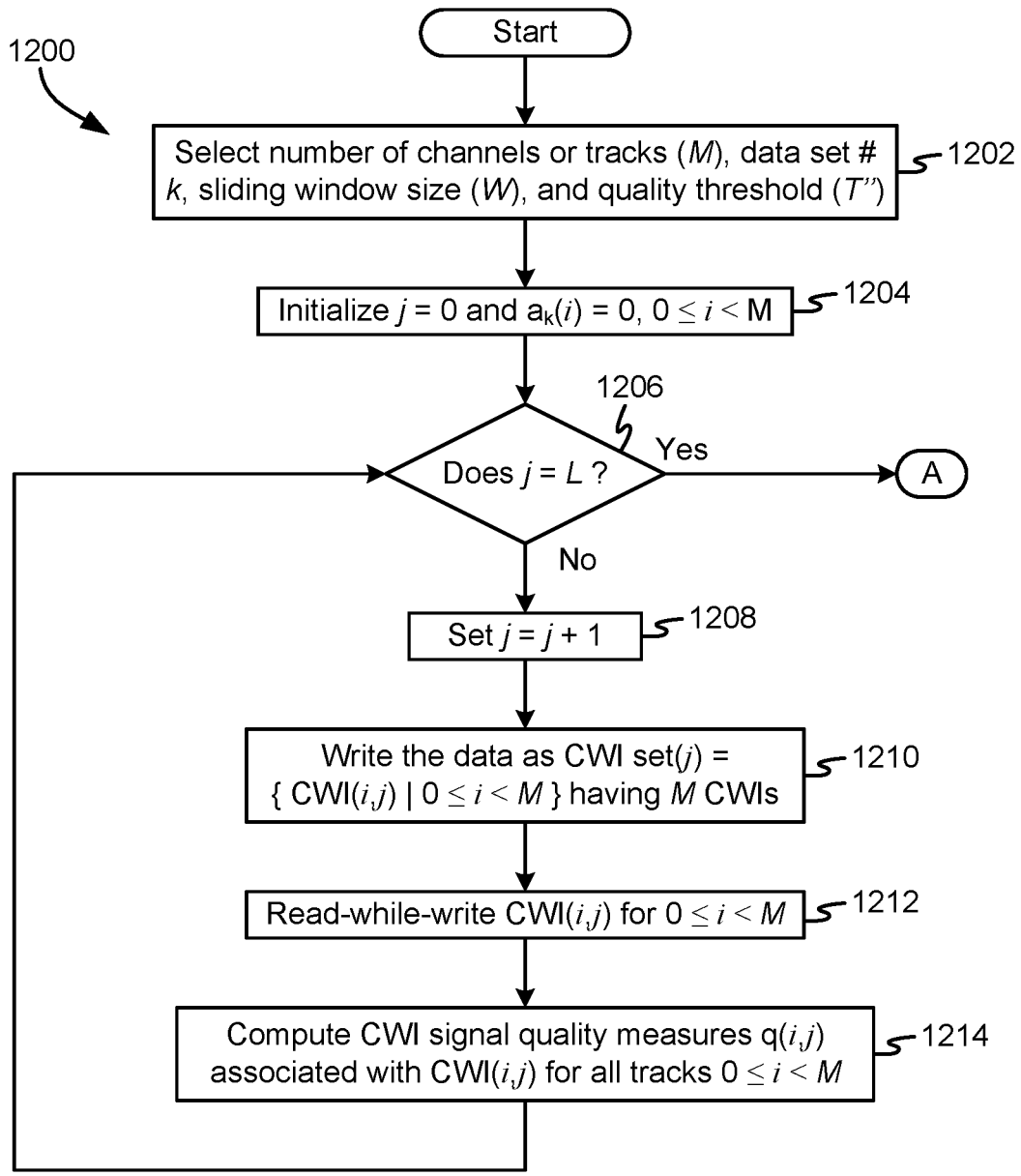
FIGS. 12A-12B show a method for data set-based dead track detection with fixed window averaging according to one embodiment.
Figure 12B:
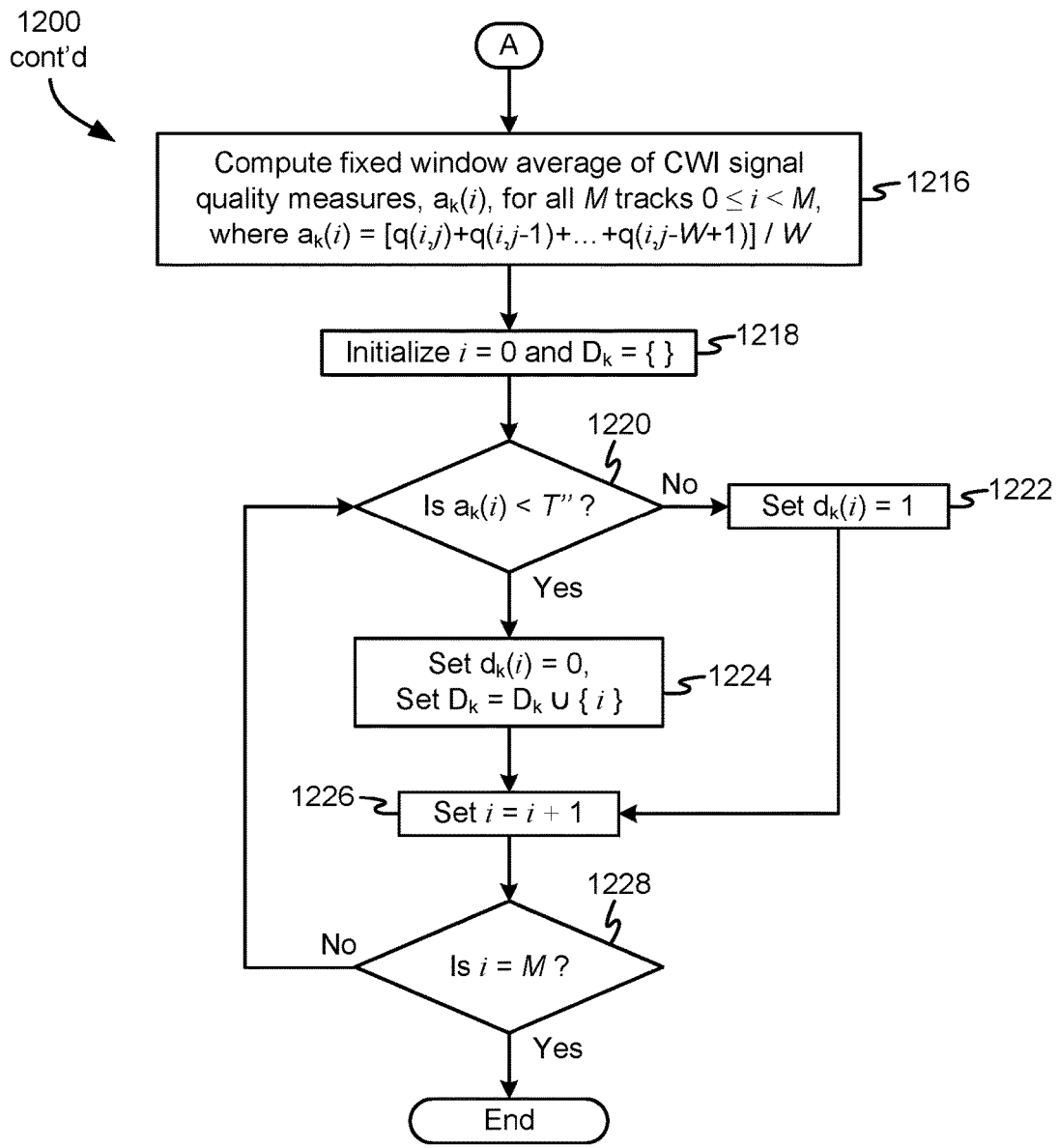

Now referring to FIGS. 12A-12B, a method 1200 for data set-based dead track detection with fixed window averaging is shown according to one embodiment. The method 1200 may be performed in accordance with the present invention in any of the environments depicted in FIGS. 1-6 and 11, among others, in various embodiments. Of course, more or less operations than those specifically described in FIGS. 12A-12B may be included in method 1200, as would be understood by one of skill in the art upon reading the present descriptions. Parameters which are denoted by capital letters are constants throughout the calculations of method 1200, while lower case denoted parameters are variables.

Each of the steps of the method 1200 may be performed by any suitable component of the operating environment. For example, in various embodiments, the method 1200 may be partially or entirely performed by a controller, a processor, a tape drive, an optical drive, or some other device having one or more processors therein. The processor, e.g., processing circuit(s), chip(s), and/or module(s) implemented in hardware and/or software, and preferably having at least one hardware component, may be utilized in any device to perform one or more steps of the method 1200. Illustrative processors include, but are not limited to, a CPU, an ASIC, a FPGA, etc., combinations thereof, or any other suitable computing device known in the art.

As shown in FIG. 12A, method 1200 may initiate with operation 1202, where a number of channels or tracks, M, is selected over which the dead track detection will be performed. Moreover, a sliding window size W is selected, the current data set # k is set, and a quality threshold T" is selected, which is a user selected parameter that dictates when the quality of the recorded data falls below a desired level.

In operation 1204, the CWI set number and time measure, j, is initialized to equal zero. The value that j will equal over the course of the execution of method 1200 depends on the arrangement of the system and sequential access medium (e.g., magnetic tape). In one embodiment, j may occupy values in a range of <1,192>, after j is initialized at zero and incremented during processing. In addition, a fixed-window average of the CWI signal quality measures is initialized at zero, e.g., $a_k(i)=0$, where 0≤i<M.

In operation 1206, a decision is made as to whether j is equal to L. If the CWI set number, j, is not equal to the number of CWI sets in a FWDS, L, method 1200 continues to operation 1208; otherwise, method 1200 moves to operation 1216 in FIG. 12B.

Referring again to FIG. 12A, in operation 1208, j is incremented by one, e.g., j→j+1. In operation 1210, the data is written to the sequential access medium. In one embodiment, the CWI set j that includes M CWIs is written as follows: CWI set (j)={CWI(i,j)|0≤i<M}.

In operation 1212, the just-written data is read in a read-while-write process. In one embodiment, all CWI(i,j) are read for 0≤i<M, which defines the number of channels or tracks being analyzed.

In operation 1214, a signal quality measure q(i,j) for the written data is computed for all tracks 0≤i<M. The signal quality measure is associated with CWI(i,j). Method 1200 then returns to operation 1206.

Now referring to FIG. 12B, after it is determined that the CWI set number, j, is equal to the number of CWI sets in a FWDS, L, a fixed-window average of the CWI signal quality measures, $a_k(i)$, is computed for all tracks in operation 1216. In one embodiment, $a_k(i)=[q(i,j)+q(i,j-1)+q(i,j-2)+ \ldots +q(i,j-W+1)]/W$ for 0≤i<M.

After the fixed-window average of the CWI signal quality measures, $a_k(i)$, is computed, in operation 1218, a counter of the logical track number, i, is initialized as zero (e.g., i=0) and the set of dead tracks, $D_k$, is set to be empty (e.g., $D_k=\{\ \}$).

In operation 1220, it is determined whether the fixed-window average of the CWI signal quality measures, $a_k(i)$, is less than the quality threshold, T". The quality threshold T" is user selectable, and may have any value that is consistent with producing good, repeatable data from the tracks of the sequential access medium. If $a_k(i)$ is greater than or equal to the quality threshold T", method 1200 continues to operation 1222 where the flag indicating a dead track, $d_k(i)$, is set equal to one (e.g., $d_k(i)=1$), which indicates that the track is not dead, but instead is a live track; otherwise, in response to $a_k(i)$ being less than the quality threshold T''' indicating poor quality of data, method 1200 moves to operation 1224 to indicate a dead track.

In operation 1224, the flag indicating a dead track, $d_k(i)$, is set to zero to indicate a dead track (e.g., $d_k(i)=0$), and the set of dead tracks, $D_k$, has the current track ADDED THERETO (E.G., $D_k=D_k \cup \{i\}$).

After either of operation 1222 and 1224, the counter of the logical track number, i, is incremented by one (e.g., i→i+1) in operation 1226. Then, in operation 1228, it is determined whether the signal quality of all tracks have been analyzed (e.g., i=M). In response to all tracks being analyzed (e.g., i=M), method 1200 ends. In response to more tracks having not yet been analyzed (e.g., i<M), method 1200 returns to operation 1220 to determine a signal quality of a next track.

Using method 1200 as described in FIGS. 12A-12B, the signal quality of each track up to a selectable number of tracks equal to M is able to be analyzed using a CWI set-based fixed-window averaged signal quality measure calculation, to filter out single track errors, and provide a conclusion as to whether an entire track or channel is experiencing a read and/or write issue preventing quality data from being stored and/or read therefrom in a consistent basis.

Figure 13A:
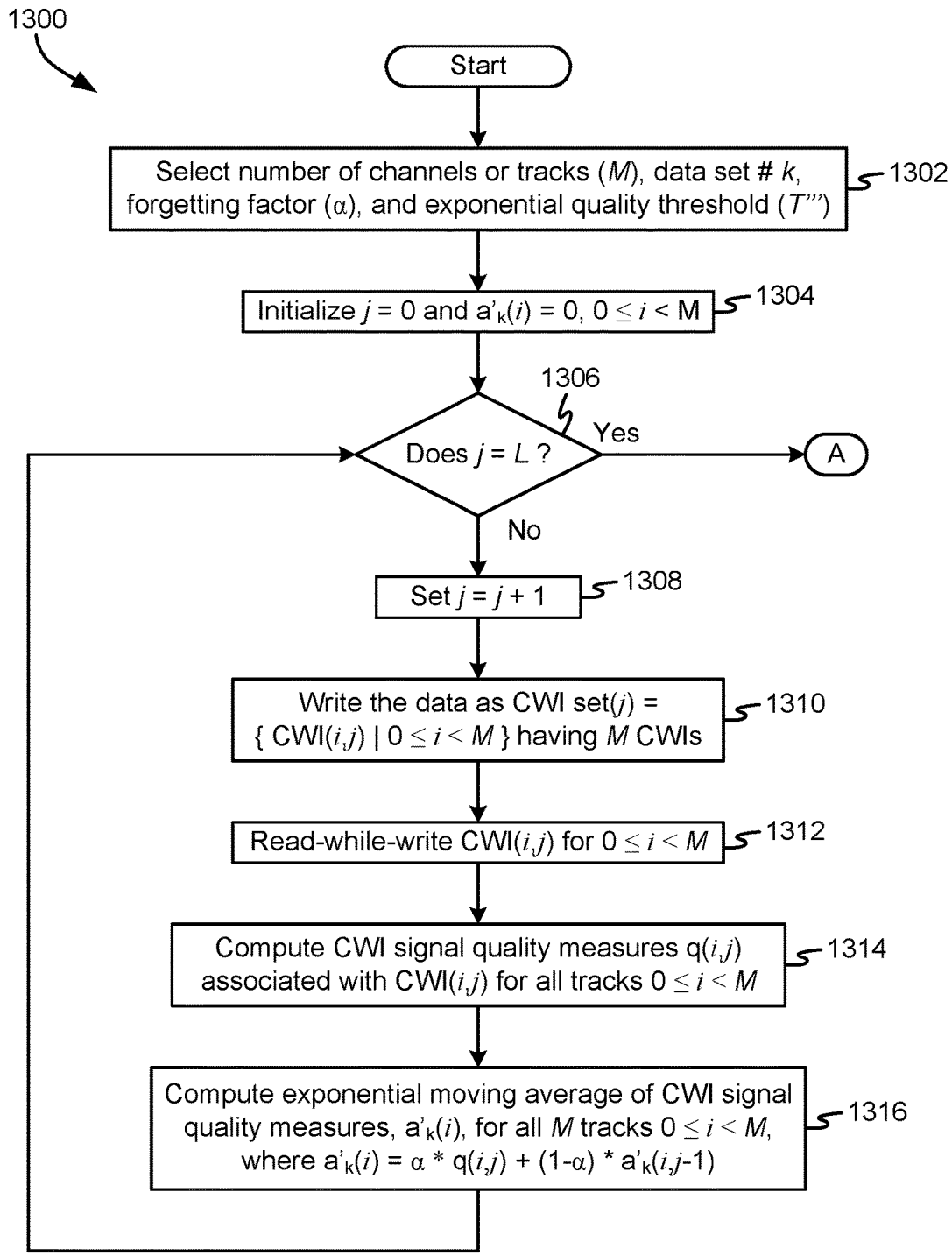
FIGS. 13A-13B show a method for data set-based dead track detection with exponential averaging according to one embodiment.
Figure 13B:
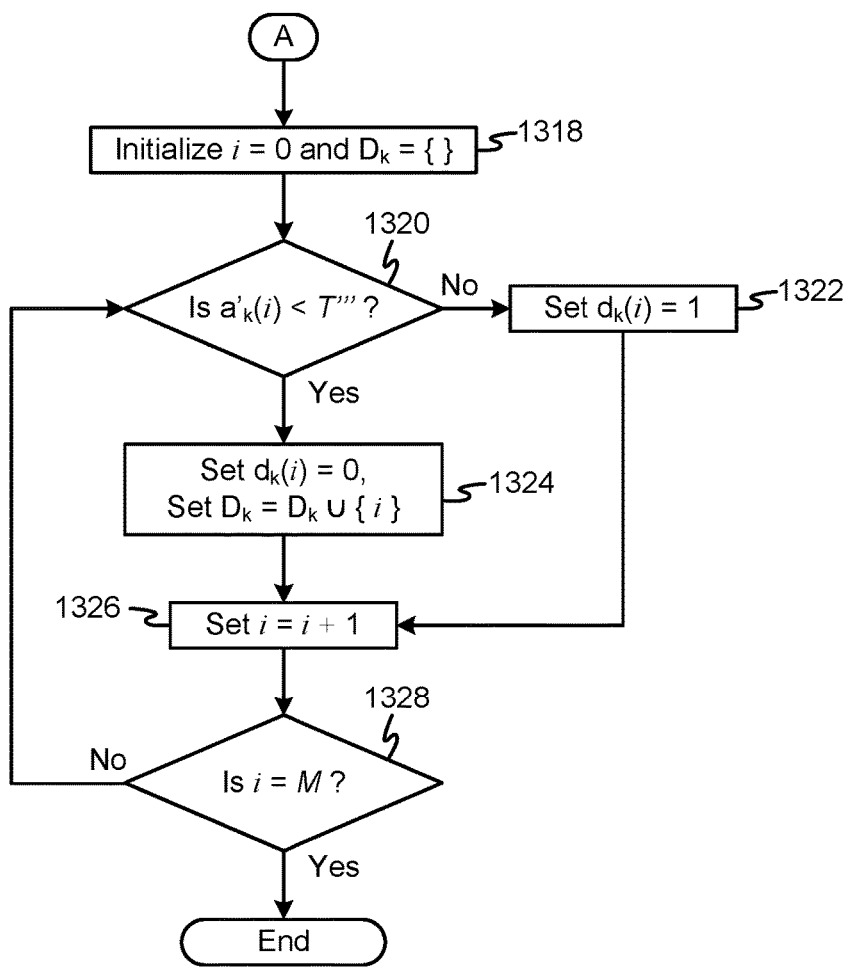

Now referring to FIGS. 13A-13B, a method 1300 for data set-based dead track detection with exponential averaging is shown according to one embodiment. The method 1300 may be performed in accordance with the present invention in any of the environments depicted in FIGS. 1-6 and 11, among others, in various embodiments. Of course, more or less operations than those specifically described in FIGS. 13A-13B may be included in method 1300, as would be understood by one of skill in the art upon reading the present descriptions. Parameters which are denoted by capital letters are constants throughout the calculations of method 1300, while lower case denoted parameters are variables.

Each of the steps of the method 1300 may be performed by any suitable component of the operating environment. For example, in various embodiments, the method 1300 may be partially or entirely performed by a controller, a processor, a tape drive, an optical drive, or some other device having one or more processors therein. The processor, e.g., processing circuit(s), chip(s), and/or module(s) implemented in hardware and/or software, and preferably having at least one hardware component, may be utilized in any device to perform one or more steps of the method 1300. Illustrative processors include, but are not limited to, a CPU, an ASIC, a FPGA, etc., combinations thereof, or any other suitable computing device known in the art.

As shown in FIG. 13A, method 1300 may initiate with operation 1302, where a number of channels or tracks, M, is selected over which the dead track detection will be performed. Moreover, a forgetting factor, α, for exponential averaging is selected, the current data set # k is set, and an exponential quality threshold T''' is selected, which is a user selected parameter that dictates when the quality of the recorded data falls below a desired level.

In operation 1304, the CWI set number and time measure, j, is initialized to equal zero. The value that j will equal over the course of the execution of method 1300 depends on the arrangement of the system and sequential access medium (e.g., magnetic tape). In one embodiment, j may occupy values in a range of <1,192>, after j is initialized at zero and incremented during processing. In addition, an exponential average of the CWI signal quality measures is initialized at zero, e.g., $a'_k(i)=0$, where $0 \leq i < M$.

In operation 1306, a decision is made as to whether j is equal to L. If the CWI set number, j, is not equal to the number of CWI sets in a FWDS, L, method 1300 continues to operation 1308; otherwise, method 1300 moves to operation 1318 in FIG. 13B.

Referring again to FIG. 13A, in operation 1308, j is incremented by one, e.g., j→j+1. In operation 1310, the data is written to the sequential access medium. In one embodiment, the CWI set j that includes M CWIs is written as follows: CWI set (j)={CWI(i,j)|$0 \leq i < M$}.

In operation 1312, the just-written data is read in a read-while-write process. In one embodiment, all CWI(i,j) are read for $0 \leq i \leq M$, which defines the number of channels or tracks being analyzed.

In operation 1314, a signal quality measure q(i,j) for the written data is computed for all tracks $0 \leq i \leq M$. The signal quality measure is associated with CWI(i,j). Method 1300 then returns to operation 1306.

In operation 1316, an exponential average $a'_k(i)$ of the signal quality measures is computed for all tracks. In one embodiment, $a'_k(i)=\alpha*q(i,j)+(1-\alpha)*a'_k(i,j-1)$ for $0 \leq i < M$. Method 1300 then returns to operation 1306.

Now referring to FIG. 13B, after the exponential average of the CWI signal quality measures, $a'_k(i)$, is computed, in operation 1318, a counter of the logical track number, i, is initialized as zero (e.g., i=0) and the set of dead tracks, $D_k$, is set to be empty (e.g., $D_k=\{\ \}$).

In operation 1320, it is determined whether the exponential average of the CWI signal quality measures, $a'_k(i)$, is less than the exponential quality threshold, T'''. The exponential quality threshold T''' is user selectable, and may have any value that is consistent with producing good, repeatable data from the tracks of the sequential access medium. If $a'_k(i)$ is greater than or equal to the exponential quality threshold T''', method 1300 continues to operation 1322 where the flag indicating a dead track, $d_k(i)$, is set equal to one (e.g., $d_k(i)=1$), which indicates that the track is not dead, but instead is a live track; otherwise, in response to $a'_k(i)$ being less than the exponential quality threshold T''' indicating poor quality of data, method 1300 moves to operation 1324 to indicate a dead track.

In operation 1324, the flag indicating a dead track, $d_k(i)$, is set to zero to indicate a dead track (e.g., $d_k(i)=0$), and the set of dead tracks, $D_k$, has the current track added thereto (e.g., $D_k=D_k \cup \{i\}$).

After either of operation 1322 and 1324, the counter of the logical track number, i, is incremented by one (e.g., i→i+1) in operation 1326. Then, in operation 1328, it is determined whether the signal quality of all tracks have been analyzed (e.g., i=M). In response to all tracks being analyzed (e.g., i=M), method 1300 ends. In response to more tracks having not yet been analyzed (e.g., i<M), method 1300 returns to operation 1320 to determine a signal quality of a next track.

Using method 1300 as described in FIGS. 13A-13B, the signal quality of each track up to a selectable number of tracks equal to M is able to be analyzed using a CWI set-based exponential averaged signal quality measure calculation, to filter out single track errors, and provide a conclusion as to whether an entire track or channel is experiencing a read and/or write issue preventing quality data from being stored and/or read therefrom in a consistent basis.

Figure 14A:
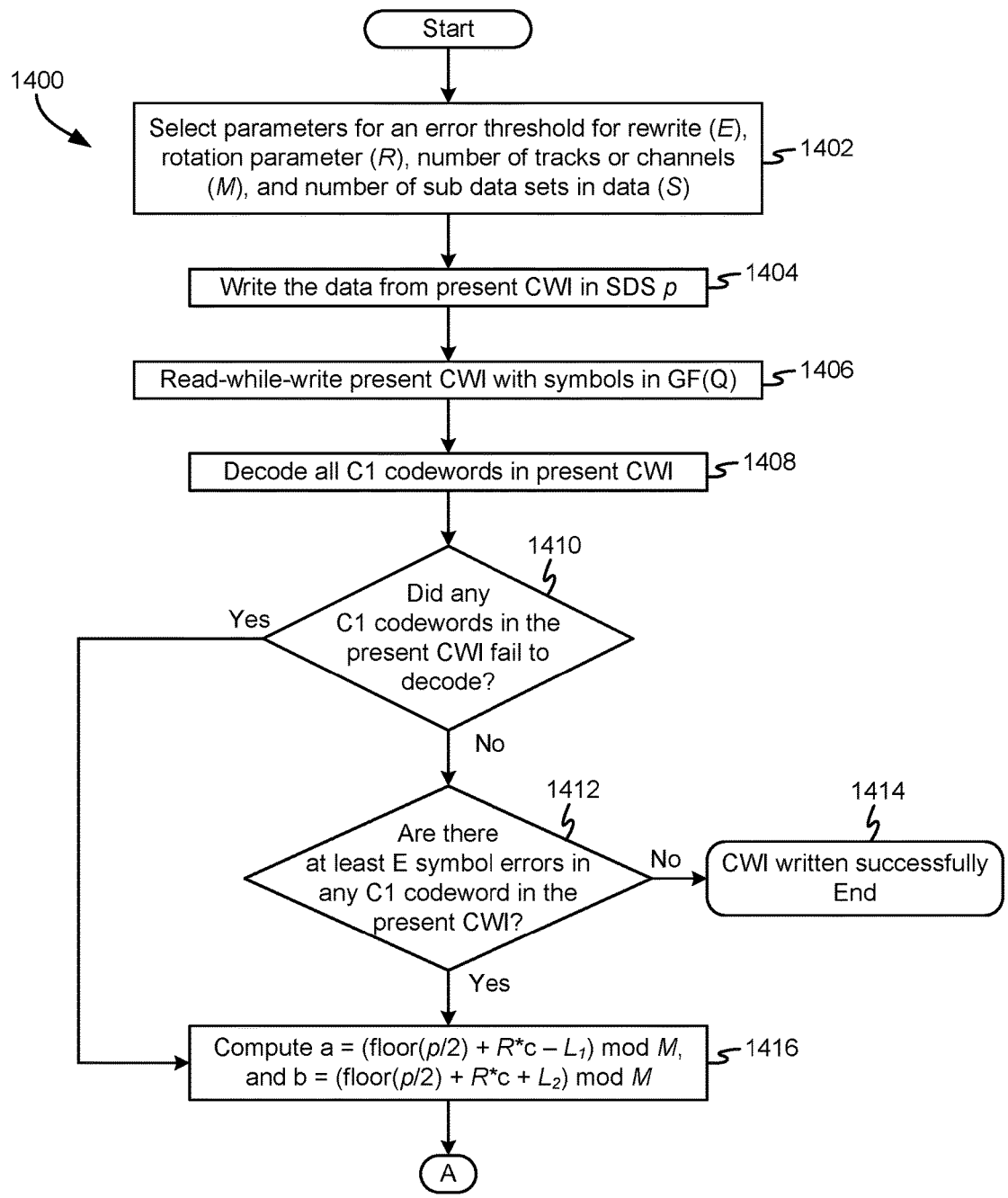
FIGS. 14A-14B show a method for rewriting data to a sequential access medium after performing data set-based dead track detection according to one embodiment.
Figure 14B:
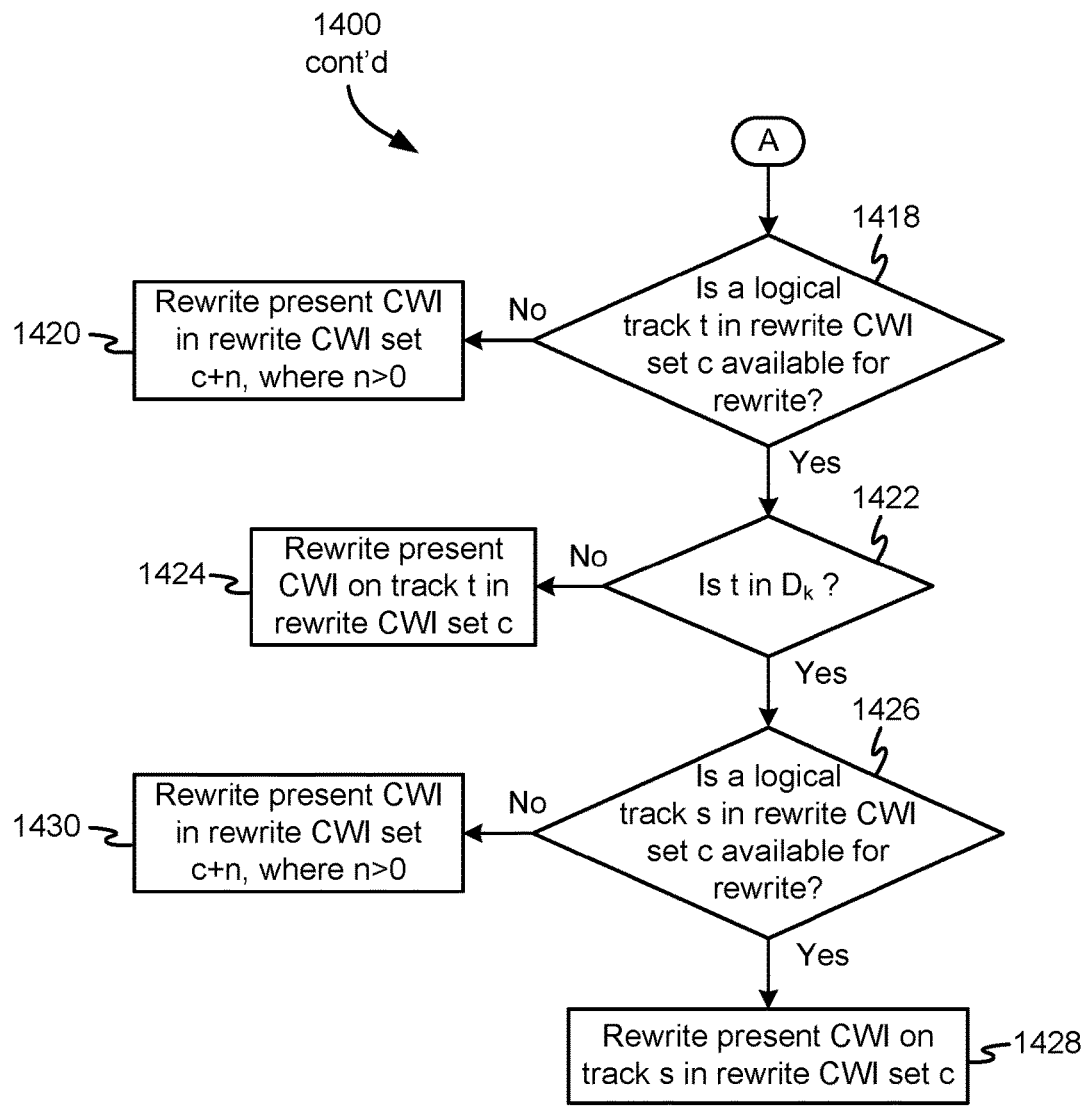

Now referring to FIGS. 14A-14B, a method 1400 for rewriting data to the sequential access medium after performing data set-based dead track detection is shown according to one embodiment. Of course, more or less operations than those specifically described in FIGS. 14A-14B may be included in method 1400, as would be understood by one of skill in the art upon reading the present descriptions. Parameters which are denoted by capital letters are constants throughout the calculations of method 1400, while lower case denoted parameters are variables.

Each of the steps of the method 1400 may be performed by any suitable component of the operating environment. For example, in various embodiments, the method 1400 may be partially or entirely performed by a controller, a processor, a tape drive, an optical drive, or some other device having one or more processors therein. The processor, e.g., processing circuit(s), chip(s), and/or module(s) implemented in hardware and/or software, and preferably having at least one hardware component, may be utilized in any device to perform one or more steps of the method 1400. Illustrative processors include, but are not limited to, a CPU, an ASIC, a FPGA, etc., combinations thereof, or any other suitable computing device known in the art.

As shown in FIG. 14A, method 1400 may initiate with operation 1402, where four parameter values, E, R, M, and S, are set, according to preferences of the user, desired results, specifics of the drive operating the sequential access medium, and/or the sequential access medium itself. E is used to denote an error threshold for rewrite, and may be set according to the number of errors within C1 codewords in a CWI as a result of C1 decoding during read-while-write which triggers a rewrite of the CWI. In various approaches, E may be set in a range from 1 to 16, such as 4 in one embodiment. R is used to denote a rotation parameter for rewrite, which indicates how data is rewritten to tracks of the sequential access medium during rewrite, and is understood by those of skill in the art. In various approaches, R may be set from 0 to 31, such as 15 in one embodiment. M is used to denote the number of channels, and is reliant on the drive being used. In one embodiment, M may be set to 32. In another embodiment, M may be set to 64. S indicates a number of sub data sets in the data sample being analyzed. In one embodiment, S=2*M.

In operation 1404, data is written to the sequential access medium. In one embodiment, the data is organized in a CWI from SDS numbered p of data set k encoded by a Reed-Solomon (RS) code $RS(N_1, K_1)$, and the CWI includes I symbol-interleaved C1 codewords over GF(Q).

The value of p may take any value within the range $0 \leq p < S$, across the range of sub data sets being analyzed. In one embodiment, I may be set to 4, but may be set to any suitable number of interleaved codewords as would be understood by one of skill in the art.

The Galois field (GF) may have any suitable number of symbols Q. In one embodiment, Q may be set to 256, but may have any value known in the art, such as 64, 128, 512, 1024, etc. According to one embodiment, $N_1$, may be set to 240, but may take any suitable value known in the art. In another embodiment, $K_1$ may be set to 228, but may take any suitable value known in the art.

In operation 1406, the just-written CWI is read in a read-while-write process. In operation 1408, all codewords in the CWI are decoded to determine C1 codewords encoded therein.

In operation 1410, it is determined whether any C1 codewords within the CWI failed to decode. In response to failure to decode at least one C1 codeword in a CWI from sub data set p, method 1400 jumps to operation 1416; otherwise, in response to all C1 codewords in the CWI from sub data set p decoding successfully, method 1400 continues to operation 1412.

In operation 1412, it is determined whether the number of symbol errors within any single decoded C1 codeword is equal to or greater than E (e.g., # errors for C1 codeword $\geq$ E). In response to no C1 codewords including at least E symbol errors therein, method 1400 moves to operation 1414; otherwise, in response to at least one C1 codeword including at least E symbol errors therein, method 1400 continues to operation 1416.

In operation 1414, it is determined that the CWI was written successfully, and that no rewriting is deemed advantageous.

In operation 1416, two boundaries are computed, a first bound, a, and a second bound, b. In one embodiment, $a = (\text{floor}(p/2) + R*c - L_1) \mod M$, and $b = (\text{floor}(p/2) + R*c + L_2) \mod M$, where c is a number of the present rewritten CWI and $0 \leq c$, $L_1$ is a nonnegative constant (e.g., 0, 1, 2, etc.), $L_2$ is a nonnegative constant (e.g., 0, 1, 2, etc.), and either a<b, or a>b, i.e., a≠b. In one embodiment, $L_1 + L_2 > 0$.

Now referring to FIG. 14B, in operation 1418, it is determined whether a logical track, t, in the rewrite CWI set, c, is available for rewrite, where ($a \leq t \leq b$ if a<b) and (t$\geq$a or t$\leq$b if b<a). In one embodiment, $0 \leq t < M$. A logical track is not available for rewrite in response to a determination that another CWI in the present SDS p has already been scheduled to be rewritten in the rewrite CWI set c on a live track t.

In response to no logical tracks in the present rewrite CWI set c being available for rewrite, method 1400 moves to operation 1420; otherwise, in response to logical track t being available for rewrite in rewrite CWI set c, method 1400 continues to operation 1422.

In operation 1420, the present CWI is rewritten on a track in rewrite CWI set c+n, where n>0. In other words, the present CWI is rewritten in a portion of the rewrite area following the portion of the rewrite area being used to rewrite the present rewrite CWI c.

In operation 1422, it is determined whether logical track tin rewrite CWI set c is included in the set of dead tracks, e.g., is tin $D_k$? In response to a determination that logical track tin rewrite CWI set c is not included in the set of dead tracks, in operation 1424, the present CWI is rewritten on track tin rewrite CWI set c.

In operation 1426, in response to a determination that logical track tin rewrite CWI set c is part of the set of dead tracks $D_k$, it is determined whether a different logical track s is available for rewrite in CWI set c. In this determination, ($a \leq s \leq b$ and s is not in $D_k$ if a<b), and either a<b, or a>b, i.e., a≠b. If a>b, s is determined such that a$\leq$s or s$\leq$b and the condition s is not in $D_k$ is satisfied. Note that $0 \leq s < M$ since s is a logical track number.

In response to a determination that a different logical track s is available for rewrite in CWI set c, the present CWI is rewritten on track s in rewrite CWI set c in operation 1428. Otherwise, in operation 1430, in response to a determination that another logical track s is not available for rewrite in CWI set c, the present CWI is rewritten on a track in rewrite CWI set c+n, where n>0.

According to various embodiments, any signal quality measurement known in the art may be used, for both moving average, sliding window, and exponential averaging embodiments.

In one embodiment, q(i,j) may be set equal to an average SNR over CWI(i,j). In another embodiment, q(i,j) may be set equal to an exponentially averaged SNR over CWI(i,j).

In accordance with another embodiment, a CWI signal quality measure may be based on C1 errors that are detectable during read-while-write of CWI(i,j) according to this equation: $q(i,j)=I*(t_1+1)-e(i,j)$. In this embodiment, $e(i,j)$=total number of byte errors corrected in CWI(i,j), and $e(i,j)=e_1(i,j)+e_2(i,j)+ \ldots +e_I(i,j)$, with I equal to a number of interleaved codewords per CWI, e.g., 1, 2, 3, 4, 6, 8, etc. Moreover, $e_m(i,j)$=number of errors detected in m-th C1 codeword during read-while-write of CWI(i,j). Note that $e_m(i,j)=t_1+1$ if the decoding of the m-th C1 codeword in CWI(i,j), $1 \le m \le I$, during read-while-write fails where $t_1$ is the error correction capability of $RS(N_1,K_1)$ C1 code, i.e., $t_1$=floor($(N_1-K_1)/2$).

In yet another embodiment, a CWI signal quality measure may be based on the CRC of the header of CWI(i,j), where q(i,j)=1 if header CRC associated with CWI(i,j) checks, and q(i,j)=0 if header CRC associated with CWI(i,j) does not check.

Of course, any other signal quality measures known in the art may be used with the techniques and methods described herein in accordance with more embodiments not specifically described herein.

When dead tracks are caused by non-functional read transducers, it may be beneficial to rewrite data from the identified dead tracks on a live track in addition to a dead track in a first tape drive (instead of rewriting no data on the dead tracks). One reason for this duplication is that when a tape cartridge that has been rewritten this way is inserted into a second tape drive that has functional read transducers, the data rewritten on the dead track (which was caused by faulty read transducers and not a problem with the track of the tape) is able to be read now because the read transducers in the second tape drive are functional. Therefore, the CWI rewritten twice on a dead track and on a live track in a first tape drive are able to be read twice in the second tape drive and encoded data in the CWI may be read more reliably with the second tape drive. This technique of writing data two or more times is known in the art as "repetition coding." Note that in this scenario the data that is being written (and rewritten) in the first tape drive is read in the second tape drive.

Figure 15:
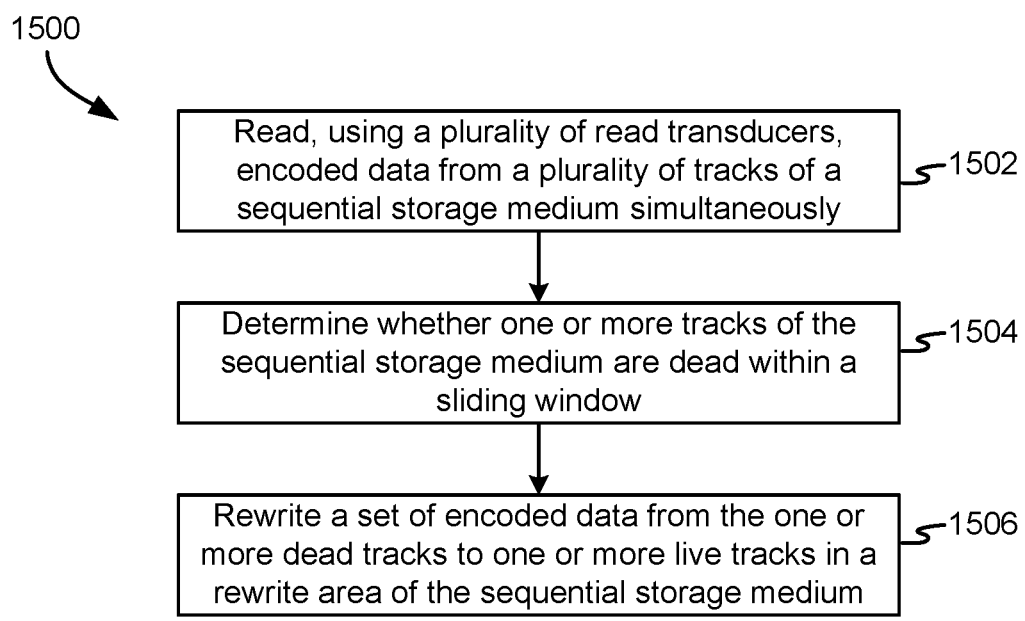
FIG. 15 shows a method according to one embodiment.

Now referring to FIG. 15, a method 1500 for detecting dead tracks and/or channels from a sequential access medium is shown according to one embodiment. The method 1500 may be performed in accordance with the present invention in any of the environments depicted in FIGS. 1-7 and 11, among others, in various embodiments. Of course, more or less operations than those specifically described in FIG. 15 may be included in method 1500, as would be understood by one of skill in the art upon reading the present descriptions.

Each of the steps of the method 1500 may be performed by any suitable component of the operating environment. For example, in various embodiments, the method 1500 may be partially or entirely performed by a controller, a processor, a tape drive, an optical drive, or some other device having one or more processors therein. The processor, e.g., processing circuit(s), chip(s), and/or module(s) implemented in hardware and/or software, and preferably having at least one hardware component, may be utilized in any device to perform one or more steps of the method 1500. Illustrative processors include, but are not limited to, a CPU, an ASIC, a FPGA, etc., combinations thereof, or any other suitable computing device known in the art.

As shown in FIG. 15, method 1500 may initiate with operation 1502, where encoded data is read, using the plurality of read transducers, from a plurality of tracks of a sequential access medium simultaneously. This data, in one embodiment, may be read with the aid of a magnetic head having a plurality of write transducers and a plurality of read transducers. Each read transducer is configured to read data from a sequential access medium after being written thereto by a corresponding write transducer, in a read-while-write process. A controller and logic integrated with and/or executable by the controller is also included to control operation of the magnetic head and movement of the sequential access medium across the magnetic head. Each read transducer is aligned with a corresponding write transducer configured to store data to the first track to enable read-while-write processing of the just stored data. In other words, the output of a read transducer is produced during read-while-write.

In operation 1504, it is determined whether one or more tracks of the sequential access medium are dead within a sliding window. A first track of the plurality of tracks is determined to be dead in response to a determination that an output from a first read transducer which reads data from the first track is insufficient. An insufficient output is indicated by a signal produced by the read transducer which is not clear, strong, and/or representative of data stored to a medium. In more embodiments, an insufficient output may be caused by any of: 1) media defects, i.e., not because of a faulty read or write transducer, 2) a faulty (non-operational) write transducer, 3) a dirty write transducer (e.g., dust particle, grease, liquid, etc., between the write transducer and the medium), 4) a faulty (non-operational) read transducer, 5) a dirty read transducer (e.g., dust particle, grease, liquid, etc., between the read transducer and the medium), etc.

Moreover, a dead track may also refer to a dead channel of the drive operating the medium, either a write channel or a read channel, as data may not be stored properly to the medium as a result of a faulty/obstructed write transducer, and data may not be read properly from a track of the medium as a result of a faulty/obstructed read transducer, either situation resulting in a determination of a dead track.

In one embodiment, all of the plurality of tracks of the sequential access medium except for the one or more dead tracks are considered to be live tracks.

In operation 1506, a set of encoded data from the one or more dead tracks is rewritten to one or more live tracks in a rewrite area of the sequential access medium. The rewrite area of the medium is located at an end of the data set, but not after individual CWI sets of the data set, as shown in FIG. 5.

Referring again to FIG. 15, the data from the one or more dead tracks may be from a first CWI set, and the data from the one or more dead tracks may be rewritten to a portion of the rewrite area corresponding to the first CWI set. The rewritten data from the one or more dead tracks may be rewritten to the portion of the rewrite area corresponding to the first CWI set along with other rewritten data from the first CWI set (which may be rewritten due to errors, media defects, etc., which are not identified as a result of a dead track).

According to another embodiment, the data from the one or more dead tracks may be from a first CWI set, and the data from the one or more dead tracks may be rewritten to a portion of the rewrite area corresponding to a second CWI set (which may be rewritten due to errors, media defects, etc., which are not identified as a result of a dead track).

In one embodiment, it may be determined whether the one or more tracks of the sequential access medium are dead by monitoring a quality of data written to the sequential access medium. The quality of the written data may be determined based on information such as: a simple moving average of a signal-to-noise ratio (SNR) for each individual track during read-while-write within the sliding window, an exponentially averaged SNR for each individual track during read-while-write within the sliding window, results of decoding first written codewords for each individual track during read-while-write within the sliding window, results of performing CRC on headers of data from a first CWI set for each individual track during read-while-write, etc.

According to another embodiment, the sliding window may include a predetermined number of CWI sets being written to the sequential access medium (such as 2, 4, 6, 8, etc.). In a further embodiment, the set of encoded data rewritten to the one or more live tracks in the rewrite area of the sequential access medium may include two CWIs.

In another embodiment, the encoded data read from the plurality of tracks may be decoded prior to determining whether any tracks of the sequential access medium are dead within the sliding window, in order to utilize the results of the decoding in assessing a quality of the written data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic, software logic such as firmware, part of an operating system, part of an application program, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
 a magnetic head having a plurality of write transducers and a plurality of read transducers, each read transducer being configured to read data from a sequential access medium after being written thereto by a corresponding write transducer; and
 a controller and logic integrated with and/or executable by the controller, the logic being configured to:
  read, using the plurality of read transducers, encoded data from a plurality of tracks of the sequential access medium simultaneously;
  determine that one or more tracks of the sequential access medium are dead within a sliding window; and
  rewrite a set of encoded data from the one or more dead tracks to one or more live tracks in a rewrite area of the sequential access medium,
  wherein a first track of the plurality of tracks is determined to be dead in response to a determination that an output from a first read transducer is insufficient, wherein the first read transducer is aligned with a first write transducer configured to store data to the first track, wherein the output of the first read transducer is produced during read-while-write, and wherein the live tracks comprise all of the plurality of tracks of the sequential access medium except for the one or more dead tracks.

2. The system as recited in claim 1, wherein the data from the one or more dead tracks is from a first codeword interleave (CWI) set, and wherein the data from the one or more dead tracks is rewritten to a portion of the rewrite area corresponding to the first CWI set.

3. The system as recited in claim 1, wherein the data from the one or more dead tracks is from a first codeword interleave (CWI) set, and wherein the data from the one or more dead tracks is rewritten to a portion of the rewrite area corresponding to a second CWI set.

4. The system as recited in claim 1, wherein the logic configured to determine whether the one or more tracks of the sequential access medium are dead is configured to monitor a quality of data written to the sequential access medium, the quality being indicated via an averaged signal-to-noise ratio (SNR) for each individual track during read-while-write within the sliding window.

5. The system as recited in claim 1, wherein the logic configured to determine whether the one or more tracks of the sequential access medium are dead is configured to monitor a quality of data written to the sequential access medium, the quality being indicated via results of decoding first written codewords for each individual track during read-while-write within the sliding window.

6. The system as recited in claim 1, wherein the logic configured to determine whether the one or more tracks of the sequential access medium are dead is configured to monitor a quality of data written to the sequential access medium, the quality being indicated via results of performing cyclic redundancy check (CRC) on headers of data from a first codeword interleave (CWI) set for each individual track during read-while-write.

7. The system as recited in claim 1, wherein the sliding window includes a predetermined number of codeword interleave (CWI) sets being written to the sequential access medium, and wherein the set of encoded data rewritten to the one or more live tracks in the rewrite area of the sequential access medium comprises two CWIs.

8. The system as recited in claim 1, wherein the logic is configured to decode the encoded data read from the plurality of tracks prior to determining whether any tracks of the sequential access medium are dead within the sliding window.

9. A method, comprising:
 reading, using a plurality of read transducers, encoded data from a plurality of tracks of a sequential access medium simultaneously;
 determining that a first of the tracks of the sequential access medium is dead within a sliding window in response to a determination that an output from a first read transducer is insufficient; and
 rewriting a set of encoded data from the one or more dead tracks to one or more live tracks in a rewrite area of the sequential access medium,
 wherein the first read transducer is aligned with a first write transducer configured to store data to the first track, wherein the output of the first read transducer is produced during read-while-write, and wherein the live tracks comprise all of the plurality of tracks of the sequential access medium except for the one or more dead tracks.

10. The method as recited in claim 9, wherein the first read transducer is aligned with a first write transducer configured to store data to the first track, wherein the output of the first read transducer is produced during read-while-write.

11. The method as recited in claim 9, wherein the data from the one or more dead tracks is from a first codeword interleave (CWI) set, and wherein the data from the one or more dead tracks is rewritten to a portion of the rewrite area corresponding to the first CWI set.

12. The method as recited in claim 9, wherein the data from the one or more dead tracks is from a first codeword interleave (CWI) set, and wherein the data from the one or more dead tracks is rewritten to a portion of the rewrite area corresponding to a second CWI set.

13. The method as recited in claim 9, wherein the determining whether the one or more tracks of the sequential access medium are dead comprises monitoring a quality of data written to the sequential access medium, the quality being indicated via information selected from the group consisting of: an averaged signal-to-noise ratio (SNR) for each individual track during read-while-write within the sliding window, results of decoding first written codewords for each individual track during read-while-write within the sliding window, and results of performing cyclic redundancy check (CRC) on headers of data from a first codeword interleave (CWI) set for each individual track during read-while-write.

14. The method as recited in claim 9, wherein the sliding window includes a predetermined number of codeword interleave (CWI) sets being written to the sequential access medium, and wherein the set of encoded data rewritten to the one or more live tracks in the rewrite area of the sequential access medium comprises two CWIs.

15. The method as recited in claim 9, further comprising decoding the encoded data read from the plurality of tracks prior to determining whether any tracks of the sequential access medium are dead within the sliding window.

16. A computer program product, the computer program product comprising a computer readable storage medium having program instructions embodied therewith, the embodied program instructions being executable by a processor to cause the processor to:

read, by the processor using a plurality of read transducers, encoded data from a plurality of tracks of a sequential access medium simultaneously;

determine, by the processor, that one or more tracks of the sequential access medium are dead within a sliding window in response to a determination that an output from a read transducer reading each dead track is insufficient; and rewrite, by the processor, a set of encoded data from the one or more dead tracks to one or more live tracks in a rewrite area of the sequential access medium, wherein a first track of the plurality of tracks is determined to be dead in response to a determination that an output from a first read transducer is insufficient, wherein the first read transducer is aligned with a first write transducer configured to store data to the first track, wherein the output of the first read transducer is produced during read-while-write, and wherein the live tracks comprise all of the plurality of tracks of the sequential access medium except for the one or more dead tracks.

17. The computer program product as recited in claim 16, wherein the embodied program instructions that cause the processor to determine whether the one or more tracks of the sequential access medium are dead further causes the processor to monitor a quality of data written to the sequential access medium, the quality being indicated via information selected from the group consisting of: an averaged signal-to-noise ratio (SNR) for each individual track during read-while-write within the sliding window, results of decoding first written codewords for each individual track during read-while-write within the sliding window, and results of performing cyclic redundancy check (CRC) on headers of data from a first codeword interleave (CWI) set for each individual track during read-while-write.

18. The computer program product as recited in claim 16, wherein the sliding window includes a predetermined number of codeword interleave (CWI) sets being written to the sequential access medium, and wherein the set of encoded data rewritten to the one or more live tracks in the rewrite area of the sequential access medium comprises two CWIs.

* * * * *